(12) United States Patent
Suganuma

(10) Patent No.: US 6,464,044 B2
(45) Date of Patent: Oct. 15, 2002

(54) BRAKING APPARATUS WHEREIN WORKING AND NON-WORKING STATES ARE ESTABLISHED BY CONTROLLING ROTATION OF CAM

(75) Inventor: Tetsuro Suganuma, Nagoya (JP)

(73) Assignee: Takahiro Engineering Works Ltd., Nagoya (JP)

( * ) Notice: Subject to any disclaimer, the term of this patent is extended or adjusted under 35 U.S.C. 154(b) by 0 days.

(21) Appl. No.: 09/759,145

(22) Filed: Jan. 16, 2001

(65) Prior Publication Data

US 2001/0018997 A1 Sep. 6, 2001

(30) Foreign Application Priority Data

Mar. 6, 2000 (JP) ........................................ 2000-060175

(51) Int. Cl.$^7$ ................................................. B60T 1/00
(52) U.S. Cl. ..................................................... 188/2 F
(58) Field of Search ............................ 188/2 F, 29, 20, 188/74, 15, 19, 22

(56) References Cited

U.S. PATENT DOCUMENTS

| | | | |
|---|---|---|---|
| 564,562 A | * | 7/1896 | Holman ........................ 188/20 |
| 4,691,933 A | * | 9/1987 | Strauss ......................... 188/2 F |
| 4,749,064 A | * | 6/1988 | Jinno et al. ................... 188/2 F |
| 4,887,830 A | * | 12/1989 | Fought et al. ............... 188/2 F |
| 4,987,978 A | * | 1/1991 | Jungersen .................... 188/2 F |
| 5,029,674 A | * | 7/1991 | Boyes et al. ................. 188/2 F |

FOREIGN PATENT DOCUMENTS

JP   A-7-227408   8/1995

* cited by examiner

*Primary Examiner*—Jack Lavinder
*Assistant Examiner*—Melanie Torres
(74) *Attorney, Agent, or Firm*—Oliff & Berridge, PLC

(57) ABSTRACT

A braking apparatus for braking a wheel of a vehicle, including: (a) a main body; (b) a cam which is supported by the main body such that the cam is rotatable about an axis thereof, and which has a cam surface whose distance from the axis changes as viewed in a circumferential direction of the cam; (c) a movable member which is held by the main body such that the movable member is movable relative to the main body, and which holds a cam follower portion engaging the cam surface, and a braking portion brought into contact with a tire of the wheel; and (d) an operating device which includes an operating member operable to be moved in first and second directions, and which rotates the cam in one of opposite directions in response to the movement of the operating member in the first direction, for thereby moving the movable member in a forward direction.

35 Claims, 21 Drawing Sheets

BRAKING APPARATUS WHEREIN WORKING AND NON-WORKING STATES ARE ESTABLISHED BY CONTROLLING ROTATION OF CAM

BACKGROUND OF THE INVENTION

1. Field of the Invention

The present invention relates to a braking apparatus for braking rotation of a wheel of a wheelchair, handcart or other vehicle. More particularly, the invention relates to a braking apparatus for use with a wheel covered at its outer periphery with a tire which is formed of a rubber or other elastic material, wherein the braking apparatus includes a member that is brought into contact with the tire, for thereby braking rotation of the wheel.

2. Discussion of Related Art

Most of conventional braking apparatuses used for wheelchairs have been designed to completely inhibit movement of the wheelchair by locking wheels of the wheelchairs. In view of a recently increasing utilization of wheelchairs in various kinds of fields, there is proposed an improved braking apparatus, e.g., a braking apparatus which is additionally equipped with a mechanism for preventing a backward movement of a wheelchair in an upslope, as disclosed in JP-A-7-227408. However, the conventional braking apparatuses including the braking apparatus disclosed in the Japanese publication have complicated constructions, and do not have sufficiently high degree of durability and maneuverability. That is, the conventional braking apparatuses should be further improved to overcome these drawbacks. Conventional braking apparatuses used for other vehicles such as handcarts carrying a person or goods have the same drawbacks to be overcome.

SUMMARY OF THE INVENTION

It is therefore an object of the present invention to provide a braking apparatus which is improved in at least one of simplification of construction, service life and maneuverability.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking apparatus for braking a wheel of a vehicle, comprising:

a main body;

a cam which is supported by the main body such that the cam is rotatable about an axis thereof, and which has a cam surface whose distance from the axis changes as viewed in a circumferential direction of the cam;

a movable member which is held by the main body such that the movable member is movable relative to the main body, and which holds a cam follower portion engaging the cam surface, and a braking portion brought into contact with a tire of the wheel; and an operating device which includes an operating member operable to be moved in first and second directions, and which rotates the cam in one of opposite directions in response to the movement of the operating member in the first direction, for thereby moving the movable member in a forward direction that causes the braking portion to be displaced toward the tire, and rotates the cam in the other of the opposite directions in response to the movement of the operating member in the second direction, for thereby moving the movable member in a reverse direction that is opposite to the forward direction.

When the operating member is operated to be moved in the first direction in the braking apparatus according to mode (1) of this invention, the cam is rotated in one of the opposite directions in response to the movement of the operating member in the first movement, and the movable member engaged at the cam follower portion with the cam surface is moved in the forward direction as a result of the rotation of the cam in the above-described one of the opposite directions, so that the braking portion of the movable member is forced against the tire of the wheel, whereby rotation of the wheel is braked. In this instance, the movable member is moved with a sufficiently large force owing to a boosting function provided by the cam surface of the cam. When the operating member is operated to be moved in the second direction in the present braking apparatus, the movable member is moved in the reverse direction as a result of the rotation of the cam in the other of the opposite directions, so that the braking portion is separated from the tire of the wheel. The mechanism used in the present braking apparatus for moving the movable member is simplified as described above, thereby making it possible to manufacture the braking apparatus in a reduced cost.

Where a grooved cam or other positive-return cam is used as the above-defined cam in the present braking apparatus, the movable member can be positively moved in the reverse direction as well as in the forward direction, by the movement of the operating member. Where a plate cam or other non-positive-return cam is used as the cam, a suitable device for returning or reversely moving the movable member is preferably provided in the present braking apparatus. The suitable device may be, for example, adapted to bias the movable member in the reveres direction whereby the movable member is moved in the reverse direction in response to the movement of the operating member in the second direction, for thereby releasing the engagement of the braking portion with the tire of the wheel.

(2) A braking apparatus according to mode (1), further comprising a reverse-movement preventing device which prevents the movement of the movable member in the reverse direction.

In the vehicle equipped with braking apparatus of this mode (2), even if an user or operator releases the operating member while the vehicle is being braked by the braking apparatus, the braking apparatus is held in its working state so that the vehicle keeps to be braked by the braking apparatus. Thus, this arrangement further improves the maneuverability of the braking apparatus.

(3) A braking apparatus according to mode (2), wherein the reverse-movement preventing device includes a positioning device which positions the movable member in a selected one of a plurality of predetermined positions relative to the main body, and holds the movable member in the selected position.

In the braking apparatus of this mode (3), the movable member is positioned and then held in a selected one of the plurality of positions, by the positioning device. The plurality of positions may be determined on the basis of an operating state of the braking apparatus. For example, where the plurality of positions consists of three positions (i.e., first, second, third positions), the three positions may be determined so as to respectively correspond to a braking state, a reverse-rotation inhibiting state and a non-working state of the braking apparatus. Described more specifically, the three positions may be determined such that (a) the braking apparatus is placed in the braking state in which the wheel is braked by the braking apparatus, when the movable member is positioned in the first position, (b) the braking apparatus is placed in the reverse-rotation inhibiting state in which reverse rotation of the wheel is inhibited or braked by the braking apparatus while forward rotation of the wheel is permitted, when the movable member is positioned in the second positioned, and (c) the braking apparatus is placed in the non-working state in which the wheel is not braked by the braking apparatus, when the movable member is positioned in the third position.

The three positions may be determined also on the basis of a working state of the braking apparatus, namely, on the basis of an amount of braking force applied to the wheel by the braking apparatus. In this case, the three positions may be determined so as to correspond to a strongly braking state, a moderately braking state and a slightly braking state of the braking apparatus, wherein respective three different braking forces are produced by the braking apparatus. Described more specifically, the three positions may be determined such that (a) the braking apparatus is placed in the strongly braking state in which the wheel is strongly braked by the braking apparatus, when the movable member is positioned in the first position, (b) the braking apparatus is placed in the moderately braking state in which the wheel is moderately braked by the braking apparatus, when the movable member is positioned in the second position, and (c) the braking apparatus is placed in the slightly braking state in which the wheel is slightly braked by the braking apparatus, when the movable member is positioned in the third position.

Thus, the arrangement of this mode (3) is effective to enable the user or operator of the vehicle to clearly recognize the operating or working state of the braking apparatus. It is to be understood that the plurality of positions may be determined on the basis of not only one of the above-described operating and working states of the braking apparatus but also the combination of the operating and working states of the braking apparatus. In this case, the above-described plurality of positions may consist of more than three, for example, five, such that the five positions are determined so as to correspond to the strongly braking state, the moderately braking state, the slightly braking state, the reverse-movement inhibiting state and the non-working state of the braking apparatus.

(4) A braking apparatus according to mode (3), wherein the positioning device includes a first engaging portion which is provided in one of the cam surface and the cam follower portion, and a second engaging portion which is provided in the other of the cam surface and the cam follower portion and which is engageable with the first engaging portion, and wherein one of the first and second engaging portions consists of a plurality of engagers which are selectively brought into engagement with the other of the first and second engaging portions.

In the braking apparatus of this mode (4), the cam is positioned and then held in a selected one of a plurality of angular positions, by the engagement of the first and second engaging portions, so that the movable member is held in one of the above-described plurality of predetermined positions which corresponds to the selected one of the angular positions of the cam. Thus, the positioning device has a simplified construction in which the first and second engaging portions are provided in one and the other of the cam surface and the cam follower portion, whereby the braking apparatus can be manufactured at a reduced cost.

(5) A braking apparatus according to mode (4), wherein the first engaging portion and the second engaging portion are provided in the cam surface and the cam follower portion, respectively, wherein the first engaging portion consists of the plurality of engagers in the form of a plurality of engaging grooves formed in the cam surface and extending in parallel with the axis, and wherein the second engaging portion consists of an engaging projection formed in the cam follower portion and having a shape substantially corresponding to that of each of the engaging grooves.

Where the cam consists of a plate cam, the engaging grooves are easily formed in an outer circumferential surface of the plate cam. Further, since the engaging groove and projection are brought into contact with each other at their respective surfaces that are comparatively large, each of the engaging groove and projection does not suffer from a large amount of wear thereof, leading to a prolonged service life of the braking apparatus.

(6) A braking apparatus according to mode (3), wherein the operating member consists of an operating lever which is supported by the main body such that the operating lever is pivotable about a pivot axis thereof, wherein the positioning device includes an engaging protruded portion which is provided in one of the main body and the operating lever, and an engaging recessed portion which is provided in the other of the main body and the operating lever and which is engageable with the engaging protruded portion, and wherein one of the engaging protruded and recessed portions consists of a plurality of engagers which are selectively brought into engagement with the other of the engaging protruded and recessed portions, so that the movable member is held in one of the plurality of predetermined positions.

(7) A braking apparatus according to mode (3), wherein the operating member consists of an operating lever which is supported by the main body such that the operating lever is pivotable about a pivot axis thereof, wherein the positioning device includes an engaging protruded portion which is provided in one of the main body and a member pivotable together with the operating lever, and an engaging recessed portion which is provided in the other of the main body and the member pivotable together with the operating lever and which is engageable with the engaging protruded portion, and wherein one of the engaging protruded and recessed portions consists of a plurality of engagers which are selectively brought into engagement with the other of the engaging protruded and recessed portions, so that the movable member is held in one of the plurality of predetermined positions.

In the braking apparatus according to mode (6) or (7), the operating lever or the member pivotable together with the operating lever is prevented from being pivoted relative to the main body, by engagement of the engaging protruded and recessed portions, thereby preventing the rotation of the cam and accordingly the reverse movement of the movable member which is engaged with the cam.

(8) A braking apparatus according to mode (6), wherein the positioning device further includes an elastic member, and wherein the engaging. protruded and recessed portions are held in engagement with each other owing to an elastic force provided by the elastic member, so that the engagement is permitted to be released by elastic deformation of the elastic member which is caused when an amount of a force applied to the elastic member exceeds a predetermined threshold.

In the braking apparatus of this mode (8), the positioning device has a simplified construction as described above, in which the engaging protruded and recessed portions are brought into engagement and are released from the engagement in a so-called snap action manner, so that the user or operator of the vehicle can clearly recognize that the movable member has been positioned in one of the above-described plurality of predetermined positions relative to the main body. Further, the engagement of the protruded and recessed portions can be easily released by simply applying a force whose amount exceeds the predetermined threshold, to the elastic member.

(9) A braking apparatus according to mode (8), wherein the engaging recessed portion is provided by a plate spring which is bent, so that the engaging protruded portion (268) is permitted to be released from the engaging recessed portion by elastic deformation of the plate spring.

(10) A braking apparatus according to mode (9), wherein the operating lever includes a shaft portion having a circular shape in a transverse cross section thereof, and wherein the engaging protruded portion is provided by the shaft portion of the operating lever.

The arrangement according to this mode (10) eliminates a member exclusively used to serve as the engaging protruded portion, and accordingly contributes to simplification of the construction of the braking apparatus.

(11) A braking apparatus according to mode (6), wherein the positioning device further includes a biasing device, and wherein the engaging protruded portion consists of a protruded portion of a movable engaging member which is held by the one of the main body and the operating lever such that the movable engaging member is movable between a projected position and a retracted position thereof and is biased by the biasing device in a direction toward the projected portion away from the retracted position.

(12) A braking apparatus according to mode (3), wherein the positioning device includes:
  a movable engaging member which is held by the operating member such that the movable engaging member is movable between a projected position and a retracted position thereof;
  a switching device which is provided in the operating member, and which is operable to selectively establish a retraction permitting state in which the movable engaging member is permitted to be moved to the retracted position, and a retraction inhibiting state in which the movable engaging member is inhibited from being moved to the retracted position; and
  a plurality of engaging recessed portions which are provided in respective portions of the main body, and which are selectively brought into engagement with a protruded portion of the movable engaging member when the movable engaging member is held in the projected position, for thereby holding the movable member in the selected one of the plurality of predetermined positions and inhibiting movement of the movable member relative to the main body from the selected position.

In this braking apparatus of this mode (12), the protruded portion of the movable engaging member is not disengaged from with the selected one of the engaging recessed portions, as long as the movable engaging member is held in its projected position by the switching device. Thus, the movable member is reliably held in the selected position relative to the main body, leading to an improved reliability in the operation of the braking apparatus.

(13) A braking apparatus according to mode (12), wherein the operating member consists of an operating lever which has an elongated tubular shape and which is pivotable about an pivot axis thereof that is perpendicular to an longitudinal direction thereof, and wherein the switching device includes:
  an operating rod which is disposed within the operating lever such that the operating rod is movable in the longitudinal direction of the operating lever, between first and second longitudinal positions thereof which are closer to longitudinally distal and proximal end portions of the operating lever, respectively;
  a biasing device which biases the operating rod toward the first longitudinal position away from the second longitudinal position;
  an operating terminal portion which is provided in one of opposite end portions of the operating rod that is closer to the longitudinally distal end portion of the operating lever, and which is operable to move the operating rod toward the longitudinally proximal end portion away from the longitudinally distal end portion, against a biasing force provided by the biasing device; and
  a working portion which is provided in the other of the opposite end portions of the operating rod, and which inhibits the movement of the movable engaging member toward the retracted position at least when the operating rod is held by the biasing force in the first longitudinal position, and permits the movement of the movable engaging member toward the retracted position when the operating rod is moved by the operation of the operating terminal portion, toward the second longitudinal position away from the first longitudinal position.

In the braking apparatus of this mode (13), the operating rod can be operated at its operating terminal portion by a hand of the user or operator of the vehicle which hand holds the operating lever, for placing the positioning device in its working state or non-working state. Thus, the reliability and maneuverability of the braking apparatus are further improved.

(14) A braking apparatus according to any one of modes (1)–(13), wherein the movable member is held by the main body such that the movable member is movable relative to the main body along a line that is perpendicular to the axis of the cam, and wherein the cam follower portion and the braking portion are held by a rear end portion and a front end portion of the movable member, respectively.

The movable member may be adapted to be pivoted, relative to the main body, about a pivot axis. However, where the movable member consists of a linearly movable member as defined in this mode (14), it is possible to further simplify the construction of the braking apparatus, or/and make the size of the braking apparatus more compact.

(15) A braking apparatus according to mode (14), wherein the cam consist of a plate cam, and wherein the cam surface is provided by an outer circumferential surface of the plate cam.

The cam may consist of any other kind of cam such as a groove cam in which a cam groove is formed in a surface perpendicular to its axis. However, where the cam consists of a plate cam as defined in this mode (15), its is possible to further simplify the construction of the apparatus and accordingly reduce the cost of manufacturing of the apparatus.

(16) A braking apparatus according to mode (15), wherein the movable member consists of a rod which is brought into sliding contact at a rear end portion thereof with the cam surface so that the rear end portion serves as the cam follower portion.

The arrangement defined in this mode (16) is effective to reduce the cost of the production of the cam follower portion.

(17) A braking apparatus according to mode (14), wherein the movable member consists of a rod, the braking apparatus further comprising a reverse-movement preventing device which prevents the movement of the rod in the reverse direction and which includes:

a pinch member including a first contact portion which is opposed to a first portion of an outer circumferential surface of the rod and which is spaced apart from the first portion by a predetermined distance, and a second contact portion which is opposed to a second portion of the outer circumferential surface of the rod that portion is opposite to the first portion and which is spaced apart from the second portion by a predetermined distance, the pinch member being held, at a portion thereof adjacent to one of the first and second contact portions, by the main body such that the pinch member is pivotable about an pivot axis thereof that is perpendicular to a longitudinal direction of the rod;

a torque applying device which applies a torque to the pinch member such that the pinch member is pivoted by the torque in such a direction that causes the first and second contact portions of the pinch member to be displaced in a direction toward the rear end portion of the movable member away from the front end portion of the movable member; and a releasing device which is operable to pivot the pinch member against the torque applied by the torque applying device.

In the braking apparatus of this mode (17), the pinch member prevents the reverse movement of the rod from a desired position relative to the main body, whereby an amount of a pressing force, by which the braking member is pressed onto the tire of the wheel of the vehicle, can be held at a desired value, thereby further improving the maneuverability of the braking apparatus. It is noted that the releasing member may include a releasing lever which is disposed pivotably about its pivot axis that is not parallel with the longitudinal direction of the rod, and which is operable to be pivoted so as to pivot the pinch member.

(18) A braking apparatus according to mode (17), wherein the operating member consists of an operating lever which is pivotable about an pivot axis thereof, and wherein the releasing device includes:

a releasing lever which is disposed pivotably about a pivot axis that is not parallel with the longitudinal direction of the rod, and which is operable to be pivoted so as to pivot the pinch member;

a grip member which is disposed in a longitudinally distal end portion of the operating lever such that the grip member is movable relative to the operating lever in a longitudinal direction of the operating lever, and which is operable to be moved in the longitudinal direction, so as to be engaged with the releasing lever for thereby pivoting the releasing lever; and a biasing device which is interposed between the grip member and the operating lever, and which biases the grip member in a direction away from the releasing lever.

In the braking apparatus of this mode (18), the releasing lever is pivoted by a simple operation in which the grip member is moved in the longitudinal direction of the operating lever against a biasing force of the biasing device, and an engagement of the pinch member with the rod is then released as a result of the pivot movement of the releasing lever. Thus, this arrangement is effective to further improve the maneuverability of the braking apparatus.

(19) A braking apparatus according to any one of modes (1)–(18), wherein the operating member consists of an operating lever which is attached at a longitudinal end portion thereof to the cam and is pivotable together with the cam about the axis of the cam.

In the braking apparatus of this mode (19), the cam can be rotated by operatively pivoting the operating lever, thereby simplifying the structure of the operating device and accordingly reducing the cost of production of the operating device.

(20) A braking apparatus according to mode (19), wherein the cam has a hole formed therein and extending in perpendicular to the axis of the cam, and wherein the longitudinal end portion of the operating lever is accommodated in the hole so that the operating lever is fixed to the cam.

In the braking apparatus of this mode (20), the operating lever is fixed to the cam, thereby further simplifying the structure of the operating device whereby the braking apparatus can be made more compact and accordingly manufacture at a further reduced cost. It is noted that the operating lever can be fixed to the cam, by any one of various manners, e.g., by press-fitting the longitudinal end portion of the operating lever into the hole of the cam, by bonding the end portion of the operating lever to the hole of the cam with a suitable welding, brazing or soldering, after introducing the end portion of the operating lever into the hole of the cam, or by screwing the end portion of the operating lever into the hole of the cam, after forming suitable threads in an outer circumferential surface of the end portion of the operating lever and in an inner circumferential surface of the hole of the cam.

(21) A braking apparatus for braking a wheel of a vehicle, comprising:

a main body;

a movable member which is held by the main body such that the movable member is movable relative to the main body, and which includes a braking portion brought into contact with a tire of the wheel; and an operating device which includes an operating member, and which is operable to move the braking portion toward and away from the tire of the wheel in response to an operation of the operating member.

Each of the braking apparatuses according to respective modes (21)–(33) may include the technical feature according to any one of the above-described modes (1)–(20), so that the braking apparatus enjoys further improved maneuverability and durability.

(22) A braking apparatus according to any one of modes (1)–(21), wherein the braking portion includes:

a braking member which is rotatable about an axis thereof; and a reverse-rotation inhibiting device which inhibits rotation of the braking member in one of opposite directions while permitting rotation of the braking member in the other of the opposite directions.

In the braking apparatus of this mode (22), the reverse-rotation inhibiting device inhibits the rotation of the braking member in the above-described one of the opposite directions and permits the rotation of the braking member in the other of the opposite directions, for thereby inhibiting a reverse rotation of the wheel that would cause the vehicle to move in its forward direction and permitting a forward rotation of the wheel that causes the vehicle to move in its rearward direction, while the braking member is held into contact with the tire of the wheel. Where the axis of the braking member is disposed in substantially parallel to an axis of the wheel, the rotation of the braking member in the above-described one of the opposite directions is interpreted to correspond to the rotation of the braking member in such a direction that causes a contact portion at which the braking member is brought into contact with the tire of the wheel, to be moved in the same direction in that a contact portion of the tire, which is brought into contact with the braking member, is moved during the reverse rotation of the wheel. The rotation of the braking member in the above-described other of the opposite directions, on the other hand, is interpreted to correspond to the rotation of the braking ember in such a direction that causes the contact portion of the braking member to be moved in the same direction in that the contact portion of the tire is moved during the forward rotation of the wheel.

Although the braking member whose rotation in the above-described one of the opposite directions is not inhibited by the braking-member-rotation inhibiting member does not inhibit the forward rotation of the wheel, the braking member applies a resistance to the forward rotation of the wheel while the braking member is pressed against the tire by a pressing force so large that the contact portion of the tire is radially inwardly deformed. The amount of the resistance to the forward rotation of the wheel increases with an increase in the amount of the pressing force by which the braking member is pressed against the tire. Thus, the braking apparatus of this mode (22) is capable of generating a suitable amount of braking force, particularly, when the vehicle is moving in a downslope. Further, the braking member does not practically slide on the tire since the braking member is rotated during the forward rotation of the wheel, leading to a reduction in the amount of wear of each of the braking member and the tire and consequently improving durability of each of the braking member and the tire.

(23) A braking apparatus according to mode (22), further comprising a rotation-resistance applying device which applies a resistance to the rotation of the braking member in the other of the opposite directions.

In the braking apparatus of this mode (23), the resistance acting against the forward rotation of the wheel is increased by an amount corresponding to the amount of the resistance applied to the rotation of the braking member by the rotation-resistance applying device. The increase in the amount of the resistance to the forward rotation of the wheel makes it possible to sufficiently brake the wheel, even without a large amount of the radially inward deformation of the contact portion of the tire during braking of the wheel. Where the wheel requires to be slightly braked while the amount of the resistance applied to the braking member by the braking-member-rotation-resistance applying member is held substantially constant, the braking member is held in sliding contact with the tire without rotation of the braking member, by reducing the pressing force by which the braking member is pressed onto the tire. In this instance, since the pressing force is reduced, there is not generate a large amount of friction force between the braking member and the tire, thereby preventing a large amount of wear of each of the braking member and the tire.

(24) A braking apparatus according to mode (23), wherein the rotation-resistance applying device constitutes a part of the reverse-rotation inhibiting device, so that the reverse-rotation inhibiting device applies the resistance to the rotation of the braking member in the other of the opposite directions although permitting the rotation of the braking member in the other of the opposite directions.

The rotation-resistance applying device may includes a resistance applying member which is brought into contact with a portion of the braking member that is other than the contact portion of the braking member that is brought into contact with the tire of the wheel such that a friction force acting between the resistance applying member and the braking member is smaller than the friction force acting between the braking member and the tire of the wheel. Further, the reverse-rotation inhibiting device may constitute a part of the rotation-resistance applying device, for thereby making it possible to further simplify the construction of the braking apparatus and accordingly reducing the cost of manufacturing of the braking apparatus.

(25) A braking apparatus according to mode (23) or (24), wherein an amount of the resistance applied by the rotation-resistance applying device to the rotation of the braking member increases with an increase of an amount of a pressing force by which the braking member is pressed onto the tire of the wheel.

(26) A braking apparatus according to mode (25), wherein the rotation-resistance applying device includes a resistance applying member which is brought into pressing contact with the baking member by a reaction force applied from the tire to the braking member when the braking member is pressed onto the tire.

In the braking apparatus of this mode (26), the resistance applied from the resistance applying member to the rotation of the braking member increases with an increase in the pressing force by which the braking member is pressed against the tire of the wheel. The resistance applied from the resistance applying member to the rotation of the braking member may be made smaller than a rotary driving force applied from the wheel to the braking member, for thereby making it possible to apply a resistance to the rotation of the wheel so as to brake the wheel, while preventing sliding movement or reducing an amount of the sliding movement of the braking member and the wheel relative to each other. It is noted that the resistance applying member may be adapted to be brought into pressing contact with a portion of the braking member which portion is other than the above-described contact portion at which the braking member is brought into contact with the tire of the wheel.

(27) A braking apparatus according to mode (26), wherein the braking portion includes:

a pivoting member which is held by the movable member such that the pivoting member is pivotable about a pivot axis thereof that is substantially parallel to an axis of the wheel of the vehicle so as to be moved between first and second pivot position thereof, and which holds the braking member in a distal end portion thereof; and a biasing device which biases the pivoting member in such a direction that causes the braking member to be brought into contact with the tire of the wheel;

and wherein the movable member is positionable in a reverse-rotation inhibiting position for establishing a reverse-rotation inhibiting state in which the braking member is brought into contact with the tire by a biasing force of the biasing device when the wheel is rotated in a forward direction thereof and in which the pivoting member is moved to the first pivot position so as to cause the braking member to bite into the tire for thereby inhibiting reverse rotation of the wheel when the wheel is about to be rotated in a reverse direction, and in a forward-rotation braking position for establishing a forward-rotation braking state in which the pivoting member is moved to the second pivot position against the biasing force of the biasing device for permitting the braking member to be brought into pressing contact with the resistance applying member.

(28) A braking apparatus according to any one of modes (1)–(27), wherein the braking portion includes:

a braking member which is brought into contact with the tire of the wheel;

an attaching device through which the braking member is attached to the movable member such that the braking member is movable relative to the movable member over a predetermined distance toward and away from the wheel; and a biasing device which biases the braking member in such a direction that causes the braking member to be moved relative to the movable member toward the wheel.

In the braking apparatus of this mode (28), even if the movable member is slightly displaced relative to the main body, the braking member keeps to be forced onto the tire of the wheel by a biasing force provided by the biasing device, whereby the braking apparatus is reliably held in its working state, and accordingly the maneuverability and reliability of the braking apparatus are further improved.

(29) A braking apparatus according to mode (28), wherein the attaching device includes a slide which is fitted on the movable member such that the slide is slidably movable relative to the movable member, and a defining device which defines a maximum distance over which the slide can be moved relative to the movable member.

(30) A braking apparatus according to any one of modes (1)–(29), wherein the braking portion includes:

a braking member which is brought into contact with the tire of the wheel;

a pivoting member which is held by the movable member such that the pivoting member is pivotable about a pivot axis thereof that is substantially parallel to an axis of the wheel of the vehicle so as to be moved between first and second pivot position thereof, and which holds the braking member in a distal end portion thereof; and a biasing device which biases the pivoting member in such a direction that causes the braking member to be brought into contact with the tire of the wheel;

and wherein the movable member is positionable in a reverse-rotation inhibiting position for establishing a reverse-rotation inhibiting state in which the braking member is brought into contact with the tire by a biasing force of the biasing device when the wheel is rotated in a forward direction thereof, and in which the pivoting member is moved to the first pivot position so as to cause the braking member to bite into the tire for thereby inhibiting reverse rotation of the wheel when the wheel is about to be rotated in a reverse direction.

In the braking apparatus of this mode (30), the reverse rotation of the wheel is reliably prevented while the movable member is positioned in the reverse-rotation inhibiting position. The vehicle, which is equipped with the present braking apparatus whose maneuverability is thus improved, is prevented from being moved in the reverse direction, even if the operating member and the wheel are released by the user during movement of the vehicle on an upslope.

(31) A braking apparatus according to mode (30), wherein the biasing device biases the pivoting member in such a direction that causes the pivoting member to be moved toward the first pivot position.

(32) A braking apparatus according to mode (30), wherein the biasing device biases the pivoting member in such a direction that causes the pivoting member to be moved toward the tire of the wheel.

(33) A braking apparatus according to any one of modes (21)–(32), wherein the braking portion includes:

a braking member which is rotatable about an axis thereof and which has an outer circumferential surface that is brought into pressing contact with the tire of the wheel.

Where the braking member is permitted to be rotated in the opposite directions, it is possible to adapt the braking apparatus to apply a desired amount of braking force to the wheel not only during the forward movement of the vehicle but also during the reverse movement of the vehicle.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
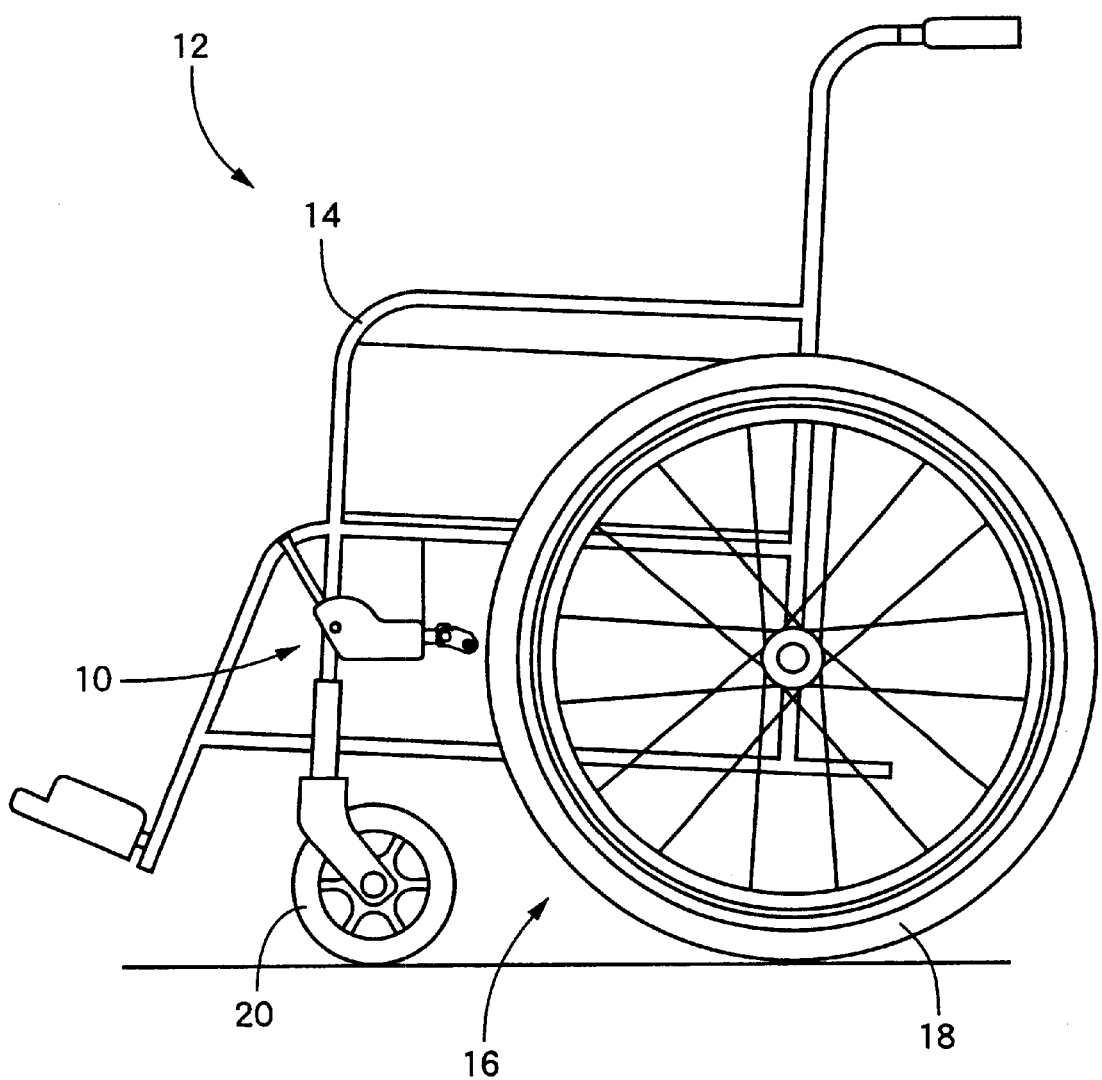
FIG. 1 is a side view of a wheelchair which is equipped with a braking apparatus constructed according to a first embodiment of the present invention.

Referring first to FIGS. 1–5, there will be described a braking apparatus 10 constructed according to a first embodiment of this invention, for use on a wheelchair 12. The braking apparatus 10 is used to be attached to a frame 14 of the wheelchair 12, such that the braking apparatus 10 is opposed to a tire 18 of a rear main wheel 16 of the wheelchair 12, as shown in FIG. 1. The wheelchair 12 has four wheels consisting of two front auxiliary wheels 20 and two rear main wheels 16. The wheelchair 12 is equipped with two braking apparatuses 10, so that the two rear main wheels 16 are braked by the respective two braking apparatuses 10.

Figure 2:
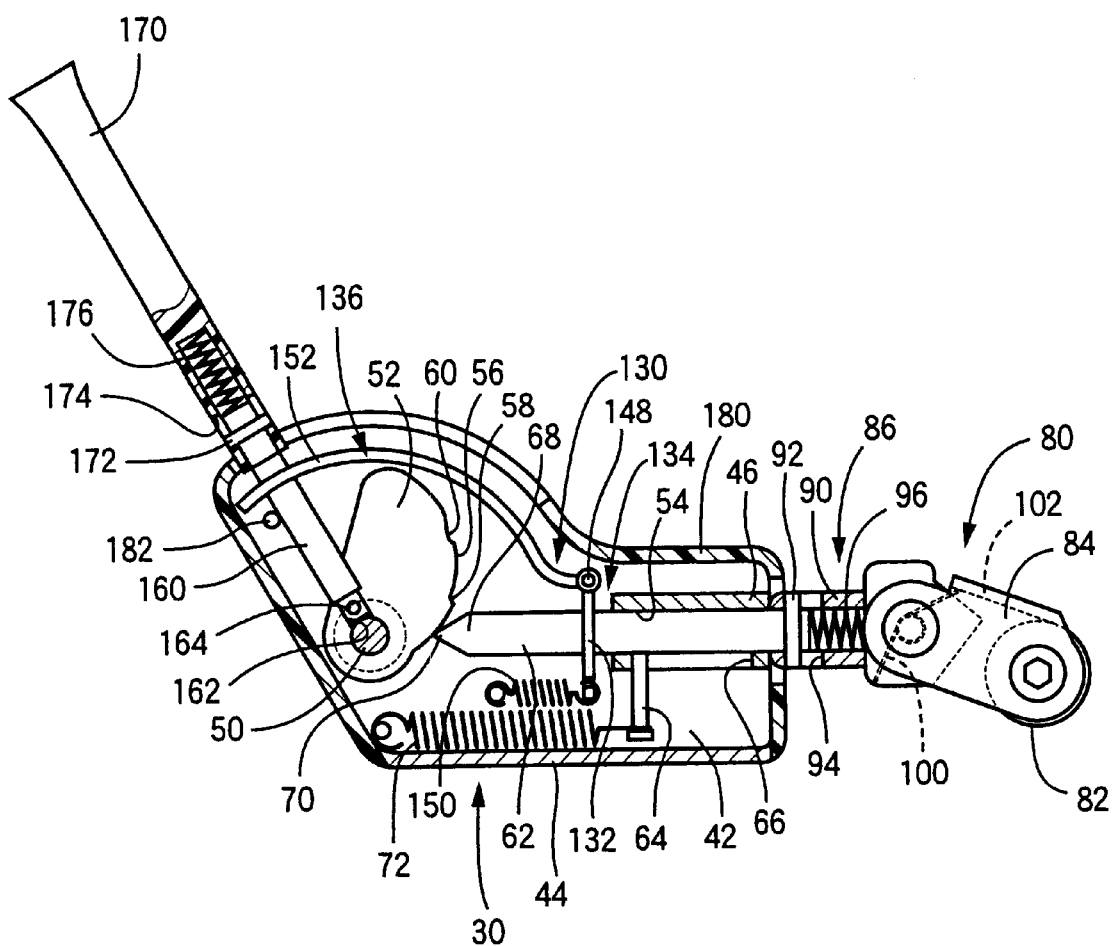
FIG. 2 is a front view partially cross section of the braking apparatus of FIG. 1.
Figure 3:
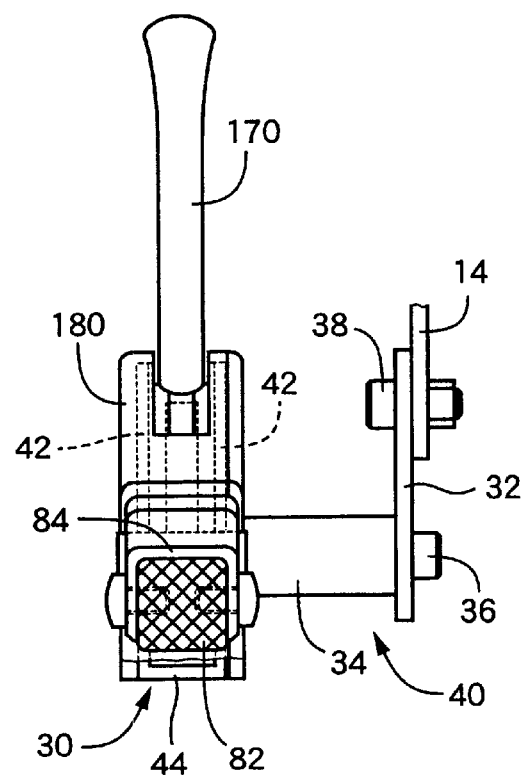
FIG. 3 is a side view of the braking apparatus of FIG. 1.
Figure 4:
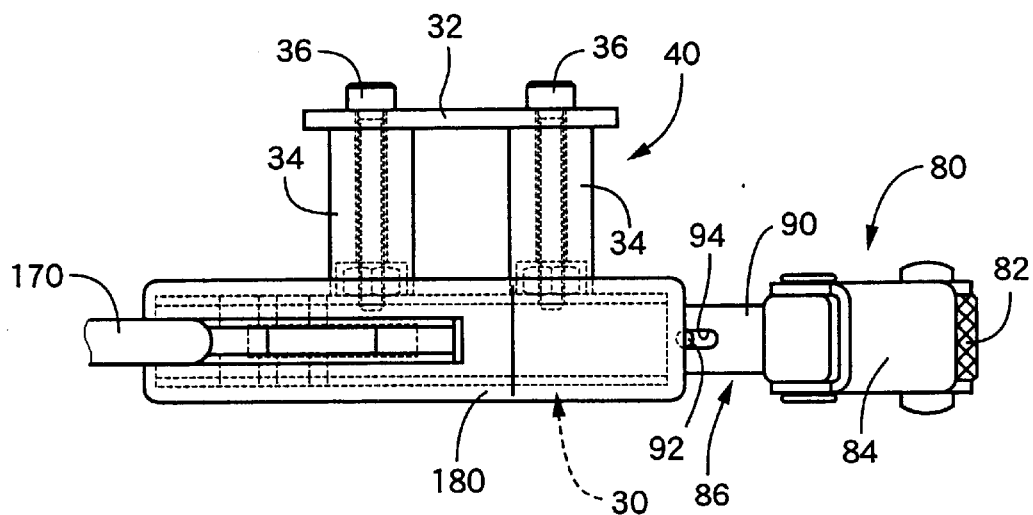
FIG. 4 is a plan view of the braking apparatus of FIG. 1.

Each of the two braking apparatus 10 is attached to the frame 14 of the wheelchair 12 through an attachment 40 which includes an adjusting member 32, two sleeves 34, 34, two screw bolts 36, 36 and a screw bolt 38, as shown in FIGS. 3 and 4. The adjusting member 32 serves to adjust a position of the braking apparatus 10 relative to the wheel 16. The braking apparatus 10 includes a main body 30 formed principally of a suitable plate member which is bent so as to have a U shape, as best shown in FIG. 3. The U-shaped plate member provides two side wall portions 42 and a bottom wall portion 44 of the main body 30. The two side wall portions 42 are connected at their respective lower ends by the bottom wall portion 44. The main body 30 includes a guide member 46 which has a tubular shape and is positioned between the two side wall portions 42. The tubular guide member 46 is fixed to the U-shaped plate member, and is held in substantially parallel with the bottom wall portion 44, as is apparent form FIG. 2.

A support shaft 50 is provided between the two side wall portions 42 of the main body 30, so as to connect the two side wall portions 42. A cam 52 is held by the support shaft 50 such that the cam 52 is rotatable about the support shaft 50. That is, the axis of the support shaft 50 serves as an axis of the cam 52. The axis of the cam 52 is perpendicular to the tubular guide member 46, and lies on the plane on which the center of a guide hole 54 of the guide member 46 lies. The cam 52 consists of a plate cam which has, in its outer circumferential surface, a cam surface 56 whose radial distance from the axis gradually changes as viewed in the circumferential direction of the cam 52. In the cam surface 56, there are formed a plurality of engagers in the form of engaging grooves. In the present embodiment, two engaging grooves 58, 60 are formed to be parallel with the axis of the cam 52, and extend over the entire axial length of the cam surface 56.

A movable member in the form of a cylindrical rod 62 is provided to be slidably fitted in the guide hole 54 of the guide member 46. Each of the rod 62 and the guide hole 54 has a circular shape in its cross section. A pin 64 projects from an longitudinally intermediate portion of the rod 62 in a direction perpendicular to the axial direction of the rod 62 over a predetermined distance. This pin 64 engages a guide slot 66, which is formed through the circumferential wall of the tubular guide member 46 and which extends over a predetermined axial distance, for thereby preventing rotation of the rod 62 about its axis while permitting axial movement of the rod 62 over a predetermined axial distance. The rod 62 has a wedge portion 68 in its rear end portion, which is one of axially opposite end portions that is closer to the cam 52. The wedge portion 68 is defined by two flat surfaces which intersect with each other at an acute angle. The acute end of the wedge portion 68 is rounded to form a part-cylindrical surface 70 which serves as an engager or engaging projection.

Between the pin 64 and a portion of the main body 30 which is distant from the pin 64 by a predetermined distance, there is provided a tension coil spring 72 which constitutes a biasing device. The coil spring 72 is engaged at its opposite ends with the pin 64 and the above-described portion of the main body 30, such that the coil spring 72 has a predetermined amount of preload. The coil spring 72 biases the rod 62 in a reverse direction that causes the engaging projection 70 of the rod 62 to be in contact with the cam surface 56. In this arrangement, the rear end wedge portion 68 of the rod 62 serves as a cam follower portion, so that the rod 62 is linearly moved in the forward and reverse directions as a result of rotation of the cam 52. It is noted that the rotation of the cam 52 in one of opposite directions, which causes the rod 62 to be moved in the forward direction, corresponds to the rotation of the cam 52 in the clockwise direction, as viewed in FIG. 2. The rotation of the cam 52 in the other of the opposite directions, which causes the rod 62 to be moved in the rear direction, corresponds to the rotation of the cam 52 in the counter-clockwise direction, as viewed in FIG. 2.

A brake portion 80 is provided to be held by the front end portion of the rod 62. The brake portion 80 includes a braking member 82, a pivot member 84 and an attaching device 86. The attaching device 86 includes a tubular slide 90 which is sidably fitted on the front end portion of the rod 62, and a pin 92 which is press-fitted in a through-hole formed in the front end portion of the rod 62 and extending perpendicularly to the axial direction of the rod 62. The tubular slide 90 has a pair of guide slots 94 which are respectively formed in diametrically opposed parts of the circumferential wall of the tubular slide 90 and which extend over a predetermined axial distance. The guide slots 94 are engaged with opposite end portions of the pin 92 which portions project from the outer circumferential surface of the rod 62 outwardly in the radial direction of the rod 62. A maximum distance over which the tubular slide 90 is movable relative to the rod 62 is defined by abutting-contact of the pin 92 with one of axially opposite end of each guide slot 94 and abutting-contact of the pin 92 with the other axial end of each guide slot 94. Between the rod 62 and the slide 90, there is provided an elastic member in the form of a compression coil spring 96 which constitutes a biasing device. The compressing coil spring 96 is interposed between the rod 62 and the slide 90 so as to be provided with a predetermined amount of preload, for thereby biasing the slide 90 in a direction away from the front end portion of the rod 62, i.e., in the forward direction of the rod 62.

The pivoting member 84 is pivotably attached at its proximal end portion to the slide 90. The pivoting member 84 is pivotable about its pivot axis which lies on the same plane that the axis of the cam 52 and the axis of the rod 62 lie on, and which is parallel with the axis of the cam 52 and is perpendicular to the axis of the rod 62. The pivoting member 84 is normally held in a predetermined angular position, as shown in FIG. 2, by a spring member in the form of a torsion coil spring 100 which constitutes a biasing device. The pivoting member 84 is slightly downwardly inclined with respect to an extension of the axis of the rod 62, as shown in FIG. 2, when the pivoting member 84 is held in the predetermined angular position. The pivoting member 84 is pivoted away from the predetermined angular position toward a second pivot end position, which is indicated by a two-dot chain line in FIG. 5, as a result of elastic deformation of the torsion coil spring 100 when the braking member 82 is strongly forced onto the tire 18 of the wheel 16 during the rotation of the wheel 18 in its forward direction, i.e, in the counter-clockwise direction as viewed in FIG. 1. The first pivot end position is defined by abutting contact of a stop portion 102 of the pivoting member 84 with a first stop surface 104 of the slide 90. The pivoting member 84 is pivoted toward a first pivot end portion indicated by a one-dot chain line in FIG. 5, when the braking member 82 is brought into contact with the tire 18 of the wheel 16 during the rotation of the wheel 16 in its reverse direction, i.e., in the clockwise direction as viewed in FIG. 1. The first pivot end portion is defined by abutting contact of the stop portion 102 of the pivoting member 84 with a second stop surface 106 of the slide 90.

The braking member 82 is rotatably held by a distal end portion of the pivoting member 84. The braking member 82 consists of a generally cylindrical hollow member having an outer circumferential surface in which a knurling pattern is formed. The braking member 82 is held by the pivoting member 84 through a reverse-rotation inhibiting device 114 which is a modification of a well-known one-way clutch. The reverse-rotation inhibiting device 114 includes a stationary shaft 116 which is held by the pivoting member 84 so as not to be rotatable relative to the pivoting member 84, a plurality of rollers 118 which are disposed on the periphery of the stationary shaft 116, and a plurality of roller-accommodating cavities 120 which are formed in a radially inner portion of the cylindrical-hollow-shaped braking member 82 and which are spaced apart from each other in the circumferential direction of the braking member 82. The knurling-patterned, outer circumferential surface of the braking member 82 serves as an outer ring of the reverse-rotation inhibiting device 114 as well as an outer ring of the baking member 82. Each of the roller-accommodating cavities 120 has a first wedge surface 124 consisting of an inclined curved surface whose radial distance from an outer circumferential surface 122 of the stationary shaft reduces as viewed in the clockwise direction in FIG. 5, and a second wedge surface 126 consisting of an flat plane that is parallel with a plane containing the axis of the stationary shaft 116. The first wedge surface 124 cooperates with the outer circumferential surface 122 of the stationary shaft 116 to define a first wedge spacing having a comparatively small wedge angle. The second wedge surface 126 cooperates with the outer circumferential surface 122 of the stationary shaft 116 to define a second wedge spacing having a comparatively large wedge angle.

Figure 5:
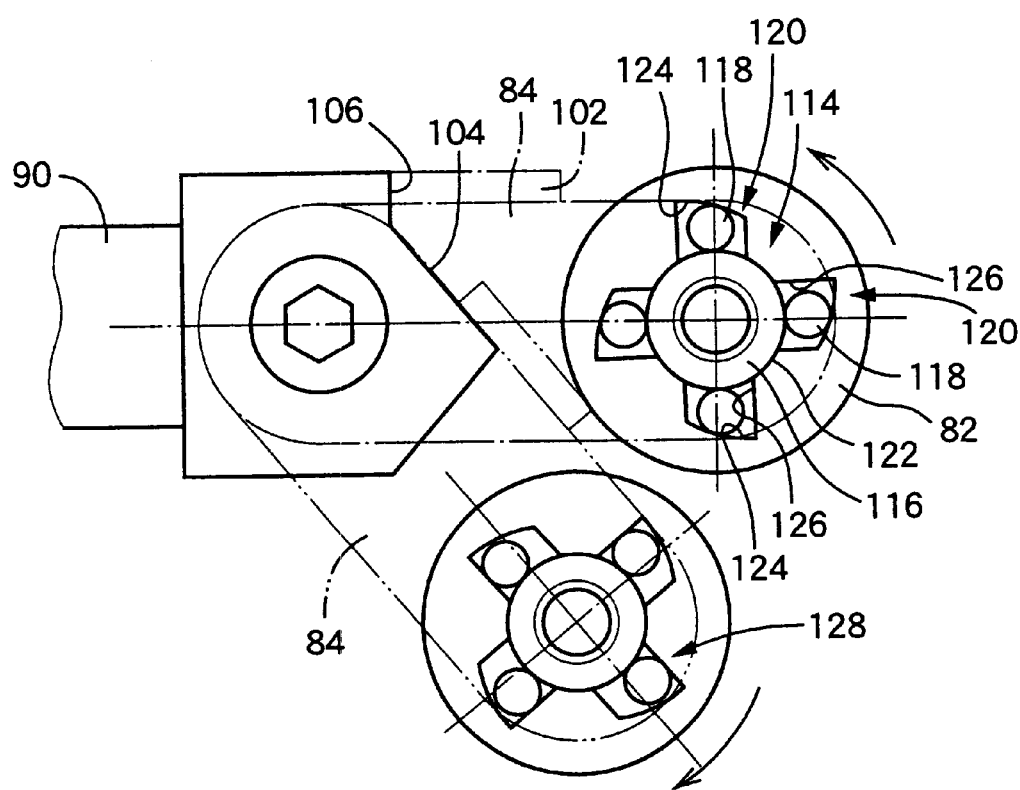
FIG. 5 is a view for explaining operation of an braking portion of the braking apparatus of FIG. 1.

In this arrangement, when the braking member 82 is rotated in the clockwise direction as shown in FIG. 5, each roller 118 accommodated in the corresponding roller-accommodating cavity 120 is displaced relative to the cavity 120 in the counter-clockwise direction, so as to be gripped by and between the second wedge surface 126 and the outer circumferential surface 122, for thereby applying a certain amount of resistance to the clockwise rotation of the braking member 82 although permitting the clockwise rotation of the braking member 82. In this respect, the braking member 82, the roller 118 and the second wedge surface 126 cooperate with each other to constitute a rotation-resistance applying device 128 which serves to apply the resistance to the rotation of the braking member 82. The amount of the resistance provided by the rotation-resistance applying device 128 varies depending upon a second wedge angle defined by the second wedge surface 126 and the outer circumferential surface 122, namely, depending upon an angle defined by the second wedge surface 126 and a plane which is tangent, at a point at that the outer circumferential surface 122 and the roller 118 are in contact with each other, to the outer circumferential surface 122. The amount of the resistance provided by the rotation-resistance applying device 128 increases with a reduction in the second wedge angle defined by the second wedge surface 126 and the outer circumferential surface 122. Thus, it is possible to suitably adjust the amount of the resistance applied to the clockwise rotation of the braking member 82, by simply changing the second wedge angle. This second wedge angle can be changed by changing, for example, the diameters of the stationary shaft 116 and the roller 118.

When the braking member 82 is about to be rotated in the counter clockwise direction as shown in FIG. 5, each roller 118 is displaced relative to the cavity 120 in the clockwise direction, so as to be gripped by and between the first wedge surface 124 and the outer circumferential surface 122, for thereby dead locking or completely inhibiting the counter-clockwise rotation of the braking member 82. A first wedge angle defined by the first wedge surface 124 and the outer circumferential surface 122 is made so small that the displacement of the first wedge surface 124 and the outer circumferential surface 122 relative to each other is inhibited by the roller 118 which is gripped by and between the two surfaces 122, 124.

Figure 6:
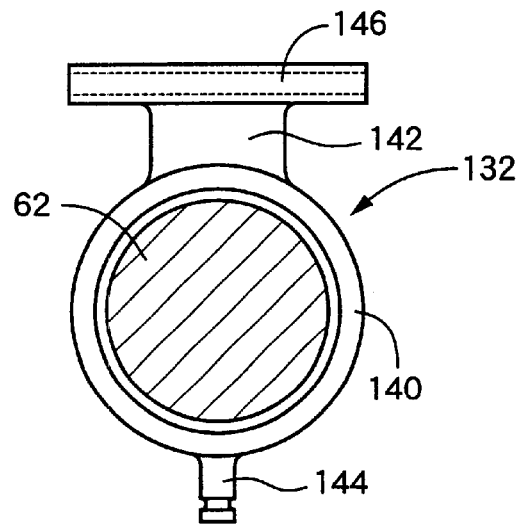
FIG. 6 is a front view of a pinch member of the braking apparatus of FIG. 1.

In the longitudinally intermediate portion of the rod 61, there is provided a reveres-movement inhibiting device 130 which includes a pinch member 132, a torque applying device 134 and a releasing member 136. The pinch member 132 has an annular portion 140 which has an inside diameter slightly larger than an outside diameter of the rod 62, as shown in FIG. 6 (in which a radial spacing between the annular portion 140 and the rod 62 is somewhat exaggeratedly represented). The pinch member 132 further has an attaching portion 142 and a spring-engaged portion 144 which project radially outwardly from respective two parts of the annular portion 140 that are diametrically opposed to each other. The attaching portion 142 has a cylindrical-hollow-shaped bearing portion 146 whose axis is perpendicular to the axis of the annular portion 140. The pinch member 132 is supported at the bearing portion 146 by a support shaft 148 which is fixed to the main body 30, such that the pinch member 132 is pivotable about the axis of the support shaft 148. The bearing portion 146 has an inside diameter which is larger than an outside diameter of the support shaft 148 by a predetermined amount, so that the pinch member 132 is displaceable relative to the main body 30 over a small distance at least in a direction substantially parallel to a line passing the attaching portion 142 and the spring-engaged portion 144.

Between the spring-engaged portion 144 and a portion of the main body 30 which is distant from the spring-engaged portion 144 by a predetermined distance, there is provided a tension coil spring 150 for serving as a spring member that cooperates with the support shaft 148 to constitute the torque applying device 134. The tension coil spring 150 is engaged at its opposite end portions with the spring-engaged portion 144 and the above-described portion of the main body 30, such that the tension coil spring 150 is provided with a predetermined amount of preload. The annular portion 140 is biased by the tension coil spring 150 in a direction toward the rear end portion of the rod 62 away from the front end portion of the rod 62, whereby the pinch member 132 is pivoted about the axis of the support shaft 148 in the clockwise direction as viewed in FIG. 2, from its perpendicular position in which the annular portion 140 has an attitude substantially perpendicular to the axis of the rod 62, until the inner circumferential surface of the annular portion 140 is brought into abutting-contact or engagement with the outer circumferential surface of the rod 62. In this instance, the outer circumferential surface of the rod 62 is pinched by the inner circumferential surface of the annular portion 140, whereby the rod 62 is prevented from being moved in the reverse direction relative to the pinch member 132 owing to a friction force acting between the mutually contacted surfaces of the annular portion 140 and the rod 62.

The releasing member 136 serves to release the contact or engagement of the pinch member 132 with the rod 62, and has a releasing lever in the form of a releasing arm 152 which extends form the bearing portion 146 of the pinch member 132. A pivot torque acting on the releasing arm 152 is transmitted to the pinch member 132, whereby the pinch member 132 is pivoted against a biasing force applied by the tension coil spring 150, in a direction toward the front end portion of the rod 62 away from the rear end portion of the rod 62, i.e., in the counter-clockwise direction (as viewed in FIG. 2) toward the above-described perpendicular position, for thereby releasing the engagement of the pinch member 132 with the rod 62. That is, in the present embodiment, the pinch member 132 and the releasing lever (releasing arm 152) are formed integrally with each other so as to provide a single piece, and has a common bearing portion consisting of the bearing portion 146 so that the pinch member 132 and the releasing lever are pivotable about a common pivot axis consisting of the axis of the support shaft 148. However, the releasing lever may be formed independently of the pinch member 132. For example, the releasing lever formed independently of the pinch member 132 may include an operating arm and a working arm, so that the working arm is engaged with the pinch member 132 by an operation of the operating arm, for thereby releasing the engagement of the pinch member 132 with the rod 62.

The cam 52 is rotated by an operation of an operating member in the form of an operating lever 160, which is fitted at its longitudinally proximal end portion in a fitting hole 162 formed in the cam 52. A pin 164 is provided to fix the operating lever 160 to cam 52, as shown in FIG. 2, for preventing removal of the operating lever 160 out of the fitting hole 162. The fitting hole 162 is formed in the cam 52 so as to intersect the axis of the cam 52 at right angles, so that the operating lever 160 is operable to be pivoted on a plane that is perpendicular to the axis of the cam 52. A grip member 170 is provided to fitted on a longitudinally distal end portion of the operating lever 160, such that the grip member 170 is movable relative to the operating lever 160 in the longitudinal direction of the operating lever 160. A maximum distance over which the grip member 170 is movable relative to the operating lever 160 is defined by engagement of an engaging pin 172 fixed to the operating lever 160, with longitudinally opposite ends of an elongated hole 174 which is formed in the grip member 170. Between the grip member 170 and the operating lever 160, there is provided an elastic member in the form of a compression coil spring 176 which constitutes a biasing device. The grip member 170 is biased by the compression coil spring 176 in a direction away from the longitudinally proximal end portion of the operating lever 160, i.e., in such a direction that would cause the grip member 170 is removed from the operating lever 160, so that the grip member 170 is separated from the releasing arm 152.

In this arrangement, when the grip member 170 is operated to pressed down toward the longitudinally proximal end portion of the operating lever 160 against a biasing force provided by the compression coil spring 176, the grip member 170 is brought into engagement with the releasing arm 152 and then forces the releasing arm 152 in such a direction that causes the releasing arm 152 to be pivoted about the axis of the support shaft 148 in the counter-clockwise direction as viewed in FIG. 2. With the counter-clockwise pivot movement of the releasing arm 152, the engagement of the pinch member 132 with the rod 62 is released. It is noted that the releasing arm 152 includes an arcuate portion which extends generally along an arc having its center at the pivot axis of the operating lever 160, i.e., at the axis of the support shaft 50, so that the grip member 170 can be held or brought into engagement with releasing arm 152 while the operating lever 160 is being operated to be pivoted.

The main body 30, and the movable members which are movably held by the main body 30 and cooperate with the main body 30 to constitute the above-described structure of the braking apparatus 10, are almost all covered by a casing 180, while some of the movable members such as the grip member 170 and the braking portion 80 project outwardly from the casing 180. In the interest of facilitating an operation for assembling the braking apparatus 10, the casing 180 consists of two members which are formed independently of each other. The two independently formed members are fixed to each other to form the casing 180 by a bonding agent, screw bolts or other suitable fixing means at the last stage of the assembling operation. The casing 180 serves as a part of the main body 30. The reference numeral 182 designates a stop member for defining a home position of the operating lever 160, i.e., a reverse stroke end position of the operating lever 160. The present braking apparatus 10 is attached to the frame 14 of the wheelchair 12 such that the axis of the cam 52 (corresponding to the axis of the support shaft 50), the pivot axis of the pivoting member 84 and the axis of the braking member 82 are held in parallel with an axis of the wheel 16 of the wheelchair 12, and such that the axis of the rod 62 substantially coincides with a radial direction of the wheel 16, namely, an extension of the axis of the rod 62 intersects the axis of the wheel 16.

An operation of the braking apparatus 10 constructed as described above will be explained.

The operating lever 160 and the cam 52 are normally positioned in the home position as shown in FIG. 2. The rod 62 is forced by the basing force provided by the tension coil spring 72, onto the cam surface 56 of the cam 52 that is held in the home position, and is accordingly positioned in its reverse stoke end position. With the rod 62 being positioned in the reverse stroke end position, the braking portion 80 is separated from the tire 18 of the wheel 16. When the operating lever 160 is operated to be pivoted from the home position over a predetermined angle in a first direction (i.e., in the clockwise direction as viewed in FIG. 2), the rod 62 having the cam follower portion in the form of the wedge portion 68 or the engaging projection 72, is moved in the forward direction by the rotation of the cam 52 in the clockwise direction (as viewed in FIG. 2) against the basing force of the tension coil spring 72. As a result of the forward movement of the rod 62, the braking portion 80 is moved toward the tire 18 and is then brought into contact with the tire 18. If the rod 62 is further moved in the forward direction after the braking portion 80 has been brought into contact with the tire 18, the pivoting member 84 is pivoted over a predetermined angle in the clockwise direction, as viewed in FIG. 2, against the biasing force of the torsion coil spring 100. In this instance, the engaging projection 70 of the rod 62 encounters the engaging groove 58 of the cam 52, and the engaging projection 70 is then brought into engagement with this engaging groove 58 in a so-called snap action manner. This engagement in the snap action manner is sensed by a user the wheelchair 12, so that the user can recognize that the rod 62 has been advanced to its reverse-rotation inhibiting position, which causes the braking apparatus 10 to be placed in its reverse-rotation inhibiting state in which reverse rotation of the wheel 16 is inhibited by the braking apparatus 10.

When the rod 62 is positioned in the reverse-rotation inhibiting position, the braking member 82 is slightly forced onto the tire 18 merely by the biasing force of the torsion coil spring 100, and applies little resistance to the rotation of the wheel 16 as long as the wheel 16 is rotated in the forward direction. Further, while the rod 62 is positioned in the reverse-rotation inhibiting position, a rotation moment or torque applied from the tire 18 to the braking member 82 is smaller than a rotation resistance applied from the rotation-resistance applying device 128 to the braking member 82, so that the braking member 82 is not rotated.

However, once the wheel 16 is about to be rotated in the reverse direction, the pivoting member 84 is pivoted by a friction force acting between the braking member 82 and the tire 18 and the biasing force of the torsion coil spring 100, in the counter-clockwise direction (as viewed in FIG. 2) until the stop portion 102 is brought into abutting-contact with the second stop surface 106, so that the braking member 82 is strongly forced onto the tire 18. In this instance, the friction force acting between the braking member 82 and the tire 18 is increased, and the braking member 82 is then forced to be rotated in its reverse direction, i.e., in the counter-clockwise direction (as viewed in FIG. 2), but the reverse rotation of the braking member 82 is not permitted by the reverse-rotation inhibiting device 114. Further, a large reaction force applied from the tire 18 to the braking member 82, is transmitted to the rod 62 via the attaching device 86 and the compression coil spring 96. This reaction force acting on the rod 62 in the reverse direction, is received by the main body 30 through the cam 52 and the support shaft 50. The reaction force applied from the tire 18 does not acts as a rotation moment that would cause the cam 52 to be rotated, although the cam surface 56 of the cam 52 is inclined with respect to a plane that is perpendicular to the axis of the rod 62. This is because of the engagement of the rod 62 and the cam 52 at their respective engaging portions (the engaging projection 70 and the engaging groove 58), and the positional relationship between the rod 62 and the support shaft 50 in which the axis of the rod 62 and the axis of the support shaft 50 lie on the same plane and are perpendicular to each other. Thus, the braking member 82 is kept to strongly bite into the tire 18, whereby the reverse rotation of the wheel 16 is reliably prevented.

The rod 62 is forced in the reverse direction as the wheel 16 is about to be rotated in the reverse direction, when the braking member 82 is held in contact with the tire 18. In this instance, even if the engaging projection 70 and the engaging groove 58 are not held in engagement with each other, the reverse movement of the rod 62 and the rotation of the cam 52 in the counter-clockwise direction (as viewed in FIG. 2) are prevented by the reverse-movement preventing device 130. The pinch member 132 of the reverse-movement preventing device 130 is biased by the biasing force of the tension coil spring 150 in a direction that causes the pinch member 132 to be pivoted about the support shaft 148 from its perpendicular position (in which the annular portion 140 has an attitude substantially perpendicular to the axis of the rod 62) in the clockwise direction (as viewed in FIG. 2), so that the annular portion 140 of the pinch member 132 is brought into contact at its inner circumferential surface with the outer circumferential surface of the rod 62. Since the inside diameter of the bearing portion 146 of the pinch member 132 is larger than the outside diameter of the support shaft 148, as described above, the annular portion 140 is brought into contact, at two opposite portions of the inner circumferential surface which are respectively adjacent to the attaching portion 142 and the spring-engaging portion 144, with the outer circumferential surface of the rod 62. That is, the rod 62 is pinched at two portions of its outer circumferential surface by the respective two opposite portions, i.e., first and second contact portions of the inner circumferential surface of the annular portion 140 of the pinch member 132.

When the rod 62 is about to be moved in the forward direction, the pinch member 132 is forced to be pivoted toward its perpendicular position in the counter-clock wise direction (as viewed in FIG. 2) by a friction force acting between the outer circumferential surface of the rod 62 and the inner circumferential surface of the annular portion 140. In other words, the pinch member 132 is forced in a direction that causes the first and second contact portions of the inner circumferential surface of the annular portion 140 to be separated from the respective two portions of the outer circumferential surface of the rod 62, whereby a pinch force applied from the pinch member 312 to the rod 62 is reduced. Thus, the forward movement of the rod 62 is not inhibited by the pinch member 132.

When the rod 62 is about to be moved in the reverse direction, on the other hand, the pinch member 132 is forced to pivoted away from its perpendicular position in the clockwise direction (as viewed in FIG. 2) by the above-described friction force between the rod 62 and the annular portion 140. In other words, the pinch member 132 is forced in a direction that causes the first and second contact portions of the inner circumferential surface of the annular portion 140 to be further forced against the respective two portions of the outer circumferential surface of the rod 62, whereby the pinch force is increased. The pinch force is thus increased with an increase in a force acting on the rod 62 in the reverse direction. Thus, the reverse movement of the rod 62 is effectively prevented by a dead lock of the pinch member 132 with the rod 62, as long as the reverse-movement preventing device 130 normally functions without its breakage or fracture.

It is to be understood that the reverse movement of the rod 62 can be prevented by the pinch member 132 even where only one of the above-described two contact portions of the inner circumferential surface of the annular portion 140 is adapted to be brought into contact with the outer circumferential surface of the rod 62. In this case, the one contact portion of the inner circumferential surface of the annular portion 140 cooperates with a portion of the inner circumferential surface of the tubular guide member 46, which portion is diametrically opposed to the one contact portion, so as to pinch the rod 62 therebetween.

When the operating lever 160 is operated to be pivoted in the first direction (in the clockwise direction as viewed in FIG. 2) over a large angle during the forward rotation of the wheel 16, the pivoting member 84 is pivoted toward the second pivot end position (in the clockwise direction as viewed in FIG. 2) as a result of contact of the braking member 82 with the forwardly rotating wheel 16, until the stop portion 102 is brought into abutting-contact with the first stop surface 104. If the operating lever 160 is pivoted further in the first direction even after the abutting-contact of the stop portion 102 with the second stop surface 104, the braking member 82 is pressed onto the tire 18 by a pressing force whose amount varies as a function of an amount of an operating force applied to the operating lever 160. While the amount of the pressing force is smaller than a certain threshold, the rotation moment applied from the tire 18 to the braking member 82 is smaller than the rotation resistance applied from the rotational-resistance applying device 128 to the braking member 82, whereby the braking member 82 is not rotated so that the rotation of the wheel 16 is somewhat braked by the friction force acting between the braking member 82 and the tire 18. When the amount of the pressing force is increased to or exceeds the certain threshold, the rotation moment applied from the tire 18 to the braking member 82 is made larger than the rotation resistance applied from the rotational-resistance applying device 128 to the braking member 82, whereby the braking member 82 starts to be rotated.

During movement of the wheelchair 12 on a gentle down slope wherein the wheelchair 12 requires to be moved in the forward direction at a moderate speed, the operating lever 160 is operated to be pivoted such that the engaging projection 70 of the rod 62 is brought into engagement with the engaging groove 60 of the cam 52, for thereby applying a suitable amount of braking force that causes the wheelchair 12 to be moved at a moderate speed. Like the engagement with the engaging groove 58, this engagement of the engaging projection 70 with the engaging groove 60 is made in a snap action manner, whereby the engagement is clearly recognized by the user of the wheelchair 12. In this state, the compression coil spring 96 interposed between the rod 62 and the slide 90 is compressed by a certain amount, and serves to minimize a variation in a distance between the rod 62 and the tire 18 which variation is caused due to, for example, a variation in the air pressure of the tire 18.

During movement of the wheelchair 12 on a steep down slope wherein the amount of the braking force has to be increased for preventing an excessive increase in the movement speed of the wheelchair 12, or for stopping the movement of the wheelchair 12, the operating lever 160 is operated to be pivoted further in the first direction (in the clockwise direction as viewed in FIG. 2) so that the amount of the pressing force by which the braking member 82 is pressed onto the tire 18 is further increased. This increase in the amount of the pressing force leads to an increase in the amount of the braking force. That is, the braking force is actually increased with the increase of the pressing force, even after the braking member 82 has started to be rotated, namely, even while the braking member 82 is being rotated.

The factors causing the increase of the braking force with the increase of the pressing force even during the rotation of the braking member 82 have not yet been made sufficiently clear. It is obvious that an amount of radially inward deformation of a local portion of the tire 18 as a result of the biting of the braking member 82 into the local portion of the tire 18 is increased with the increase of the pressing force, and that an amount of energy required for displacing the deformed local portion of the tire 18 in the circumferential direction is increased with the increase of the amount of the radially inward deformation of the local portion of the tire 18. It is accordingly assumed that the increase in the amount of the local deformation of the tire 18 constitutes one of the factors. In another view, it is also obvious that the a friction force acting between the braking member 82 and the stationary shaft 116 is increased with the increase of the pressing force. Thus, it is assumed that the increase in the friction force between the braking member 82 and the stationary shaft 116 also constitutes one of the factors.

Figure 7:
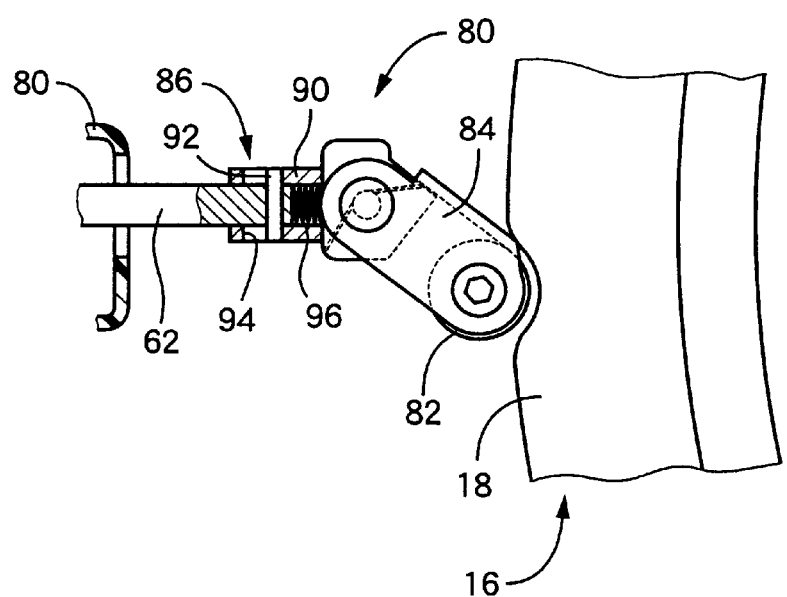
FIG. 7 is a view illustrating a locking state in which rotation of the wheel is locked by the braking portion of the braking apparatus of FIG. 1.

When the operating lever 160 is operated to be pivoted still further in the first direction (in the clockwise direction as viewed in FIG. 2), the compression coil spring 96 interposed between the rod 62 and the slide 90 is further compressed until the pin 92 is brought into abutting-contact with the end of the guide slot 94, and even the pivoting member 84 is then brought into abutting-contact at a portion thereof with the tire 18, as somewhat exaggeratedly indicated in FIG. 7 As a result of the contact of the pivoting member 84 with the tire 18, the wheel 16 is practically inhibited from being rotated, so that the movement of the wheelchair 12 is locked.

When the braking apparatus 10 requires to be placed in its non-working state, the grip member 170 is pressed down against the biasing force of the compression coil spring 176, so that the grip member 170 is brought into engagement with the releasing arm 152. The above-described pivot torque is applied from the grip member 170 to the releasing arm 152, and the pivot torque acting on the releasing arm 152 is then transmitted to the pinch member 132 by the releasing arm 152, whereby the pinch member 132 is pivoted in the counter-clockwise direction (as viewed in FIG. 2) toward the perpendicular position, for thereby releasing the engagement of the pinch member 132 with the rod 62. While the pinch member 132 is not engaged with the rod 62, the rod 62 is permitted to be moved in the reverse direction. That is, when the operating lever 160 is operated to be pivoted in the second direction with the grip member 170 kept pressed down, the rod 62 is moved in the reverse direction, following the rotation of the cam 52 in the counter-clockwise direction (as viewed in FIG. 2). With the reverse movement of the rod 62, the braking member 82 is moved in a direction away from the tire 18, for reducing the amount of the braking force applied to the wheel 16. Further, with separation of the braking member 82 from the tire 18, the braking apparatus 10 is placed in its non-working state.

Figure 8:
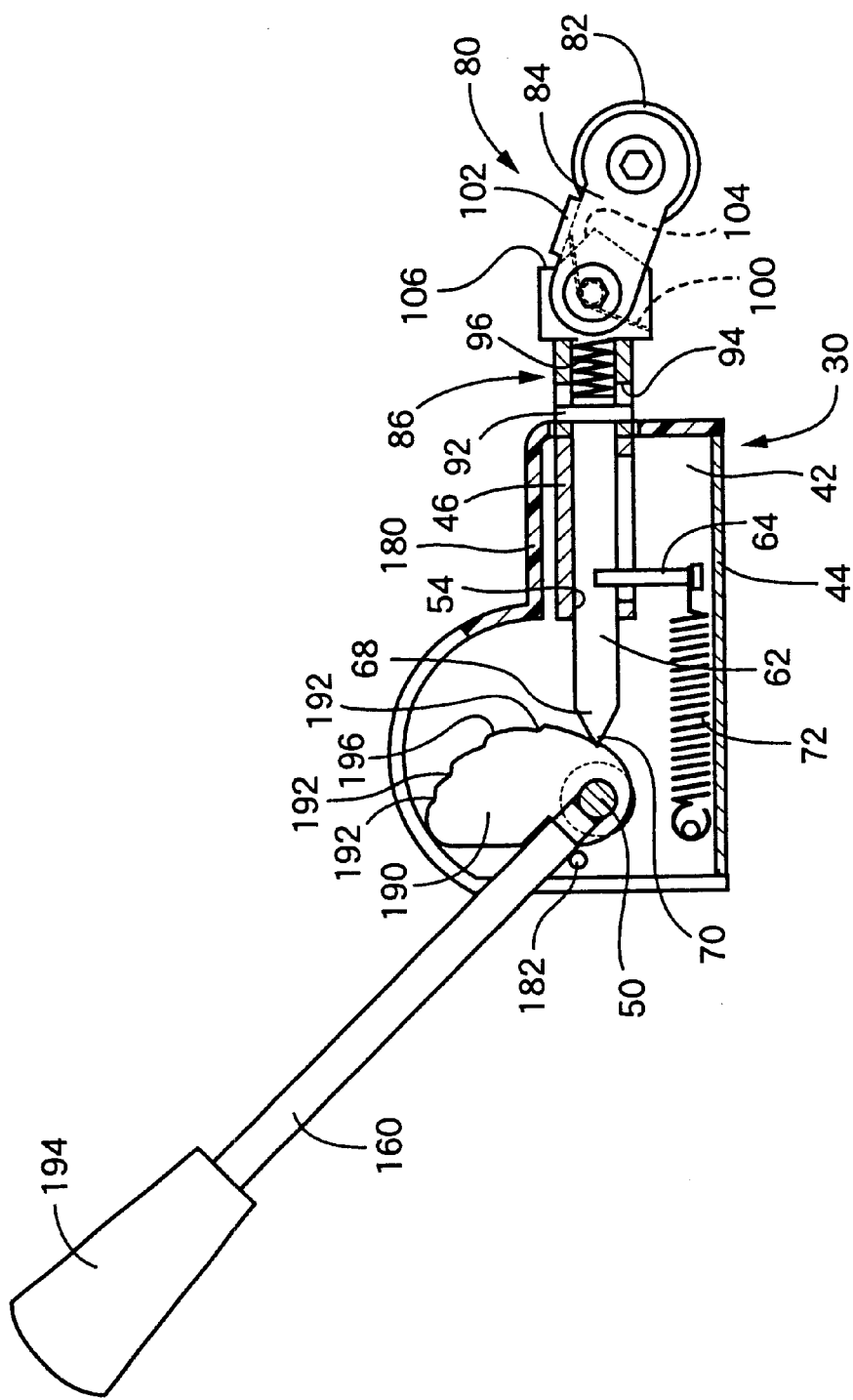
FIG. 8 is a front view partially cross section of a braking apparatus constructed according to a second embodiment of the invention.

Referring next to FIG. 8, there is shown a braking apparatus constructed according to a second embodiment of the invention. This braking apparatus is different from the braking apparatus of the first embodiment in that the reverse-movement preventing device 130 is not provided in the apparatus, and in that the cam 52 is replaced by a cam 190 which has a plurality of engaging grooves 192 formed in its cam surface 196. In the braking apparatus of the first embodiment, even when the engaging projection 70 is not held in engagement with either of the engaging grooves 58, 60, the braking apparatus can be held in its working state owing to the provision of the reverse-movement preventing device 130, irrespective of whether the operating lever 160 (more precisely, the grip member 170) is held or released by the operator. In the braking apparatus of the present second embodiment, on the other hand, the braking apparatus is held in its working state, only when the engaging projection 70 is held in engagement with one of the engaging grooves 192. However, the braking apparatus of the second embodiment has an advantage that the construction is simplified owing to the absence of the reverse-movement preventing device 130. Further, unlike the grip member 170 in the first embodiment, a grip member 194 is simply fixed to the operating lever 160, since the inhibiting device 130 is not provided. This arrangement also contributes the simplification of the construction of the braking apparatus of the second embodiment. In the other aspects of the braking apparatus according to the present second embodiment, the present apparatus is identical with the braking apparatus of the first embodiment. The same reference numerals as used in the first embodiment will be used to identify the functionally corresponding elements, and redundant description of these elements of the present baking apparatus will not be provided.

In the first embodiment, the engaging grooves 58, 60 formed in the cam surface 56 of the cam 52 cooperate with the engaging projection 70 of the rod 62 to constitute an operation-state recognizing device for enabling the operator to recognize that the braking apparatus 10 is placed in a certain operating state. The engaging grooves 58, 60 and the engaging projection 70 may be considered to constitute also a safety device for assuring prevention of the reverse movement of the movable member in the form rod 62 even if the reverse-movement preventing device 130 does not satisfactorily prevent the reverse movement of the rod 62. Alternatively, the reverse-movement preventing device 130, instead of the engaging grooves 58, 60 and the engaging projection 70, may be considered to constitute a safety device for assuring the prevention of the reverse movement of the rod 62.

In the first and second embodiments, the engaging grooves 58, 60, 192 and the engaging projection 70 are considered to cooperate with each other to constitute a reverse-movement preventing device for preventing the reverse movement of the movable member from a predetermined position relative to the main body 30, or a positioning device for positioning the movable member in the predetermined position and holding the movable member in the predetermined position.

Figure 9:
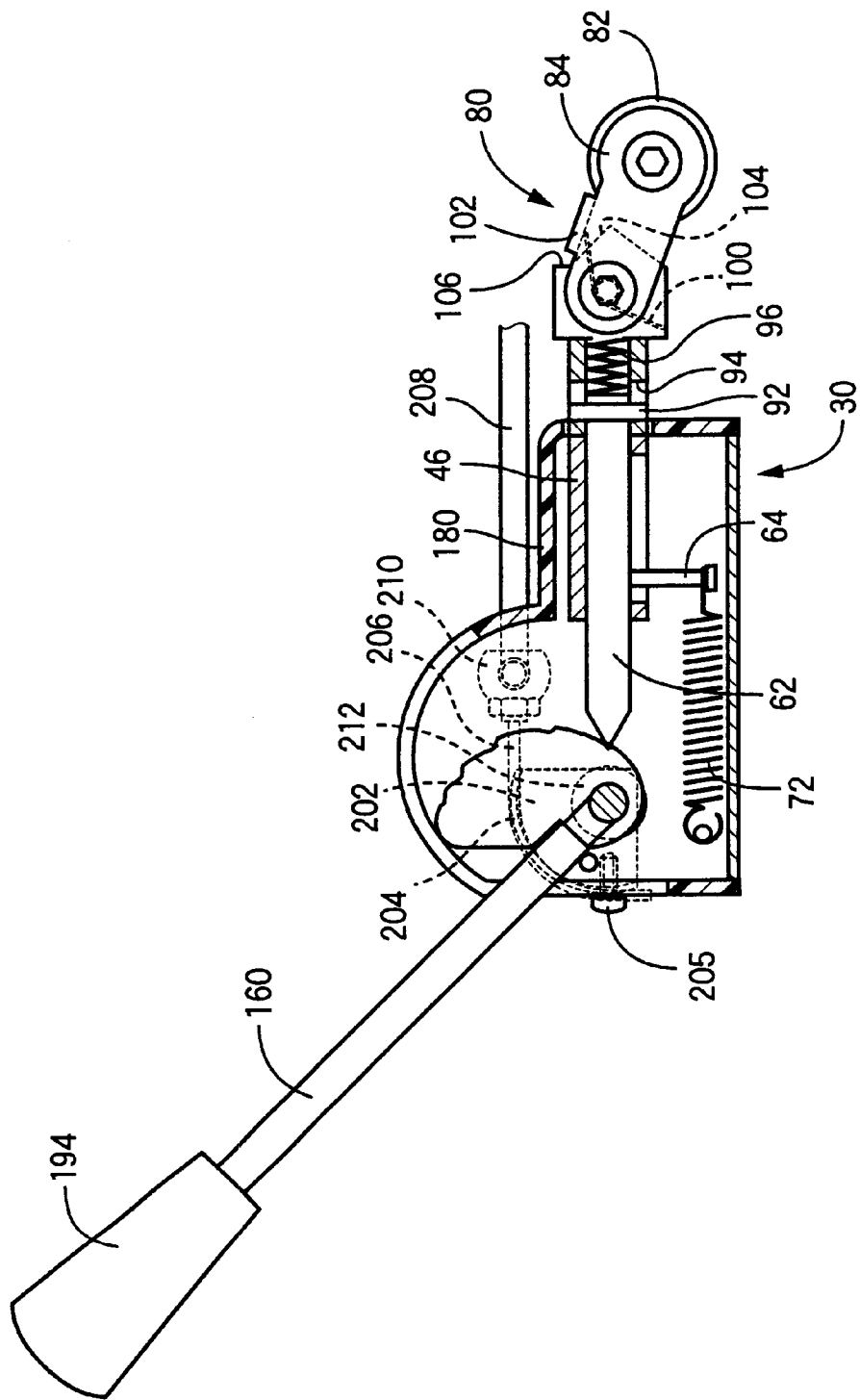
FIG. 9 is a front view partially cross section of a braking apparatus constructed according to a third embodiment of the invention.
Figure 10:
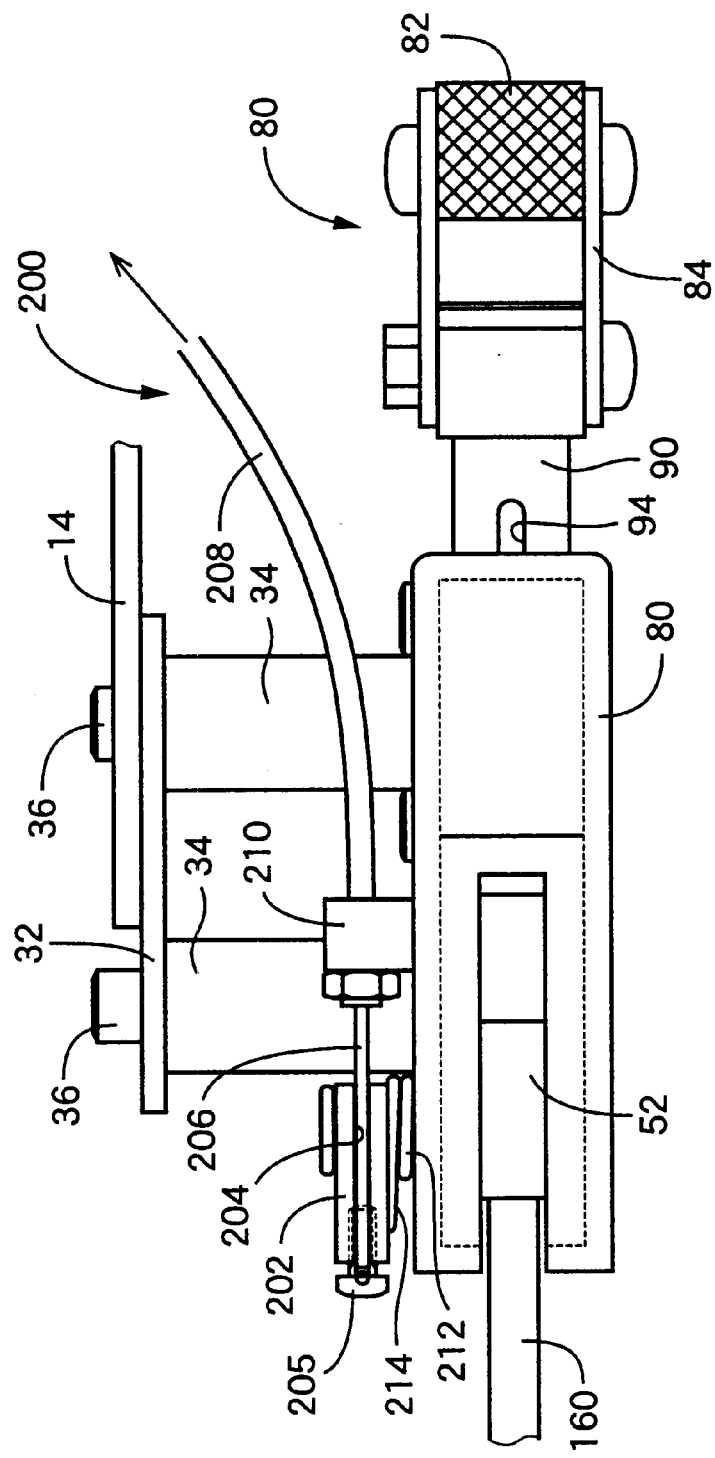
FIG. 10 is a plan view of the braking apparatus of FIG. 9.

Referring next to FIGS. 9-10, there is shown a braking apparatus constructed according to a third embodiment of the invention. This braking apparatus is different from the braking apparatus of the second embodiment shown in FIG. 8, in that an auxiliary operating device 200 operable by a helper (who walks together with the wheelchair 12) is additionally provided. The auxiliary operating device 200 includes a fan-shaped pulley 202 fixed to the support shaft 50 to which the cam 52 is rotatably attached. The fan-shaped pulley 202 has a guide groove 204 formed in its outer circumferential surface and extending in its circumferential direction. The guide groove 204 serves to guide a wire cable 206 which is fixed at one of its opposite end portions to the pulley 202 by a clamping screw 205. The wire cable 206 is introduced into an outer tube 208, so as to be guided by the outer tube 208. The outer tube 208 is formed of a material which has a certain degree of flexibility but should not be contracted or shrunk. One of opposite ends of the outer tube 208 is fixed to the main body 30 through a fixing member 210, while the other end of the outer tube 208 is fixed to a handle or other suitable part (not shown) of the wheelchair 12. The other of the above-described opposite end portions of the wire cable 206 projects outwardly from the other end (not shown) of the outer tube 208 is connected to an operating member in the form of an operating lever which is provided in the handle or other suitable part. In this arrangement, when the operating member is operated by the helper, the wire cable 206 is given a tension force, whereby the pulley 202 and the cam 52 fixed to each other are rotated so that the braking apparatus is placed in its working state. It is noted that an operation for switching the braking apparatus from its working state to its non-working state is achieved principally by operating the operating lever 160 since the auxiliary operating device 200 is provided so as to serve as an emergency device.

However, the switching operation from the working state to the non-working state can be achieved by operating the handle or operating lever which is disposed in such a position that facilitates its operation by the helper. A torsion coil spring 214, which serves as a spring member constituting a biasing device, is provided to be attached to a boss 212 of the pulley 202. The torsion coil spring 214 is engaged at its opposite end portions with the main body 30 and the pulley 202, respectively, such that a biasing force of the torsion coil spring 214 acts as a rotation moment which is applied to the pulley 202 and which forces the pulley 202 to be rotated in the counter-clockwise direction as viewed in FIG. 9. In this arrangement in which the pulley 202 is always biased in the counter-clockwise direction, the cam 52, the operating lever 160 and the pulley 202 are returned toward their home positions, with a reduction in an operating force which is applied to the operating member by the helper, whereby the braking apparatus is placed in its non-working state. In this instance, the braking apparatus can not be held in its working state by engagement of the engaging grooves 192 of the cam 52 with the engaging projection 70 of the rod 62. In view of this, the braking apparatus is preferably equipped with, for example, the above-described reverse-movement preventing device 130 or the like which includes a releasing member operable to permit the rod 62 to be moved in the reverse direction. It is preferable that the releasing member is disposed in such a position that facilitates operation thereof by the helper.

Figure 11:
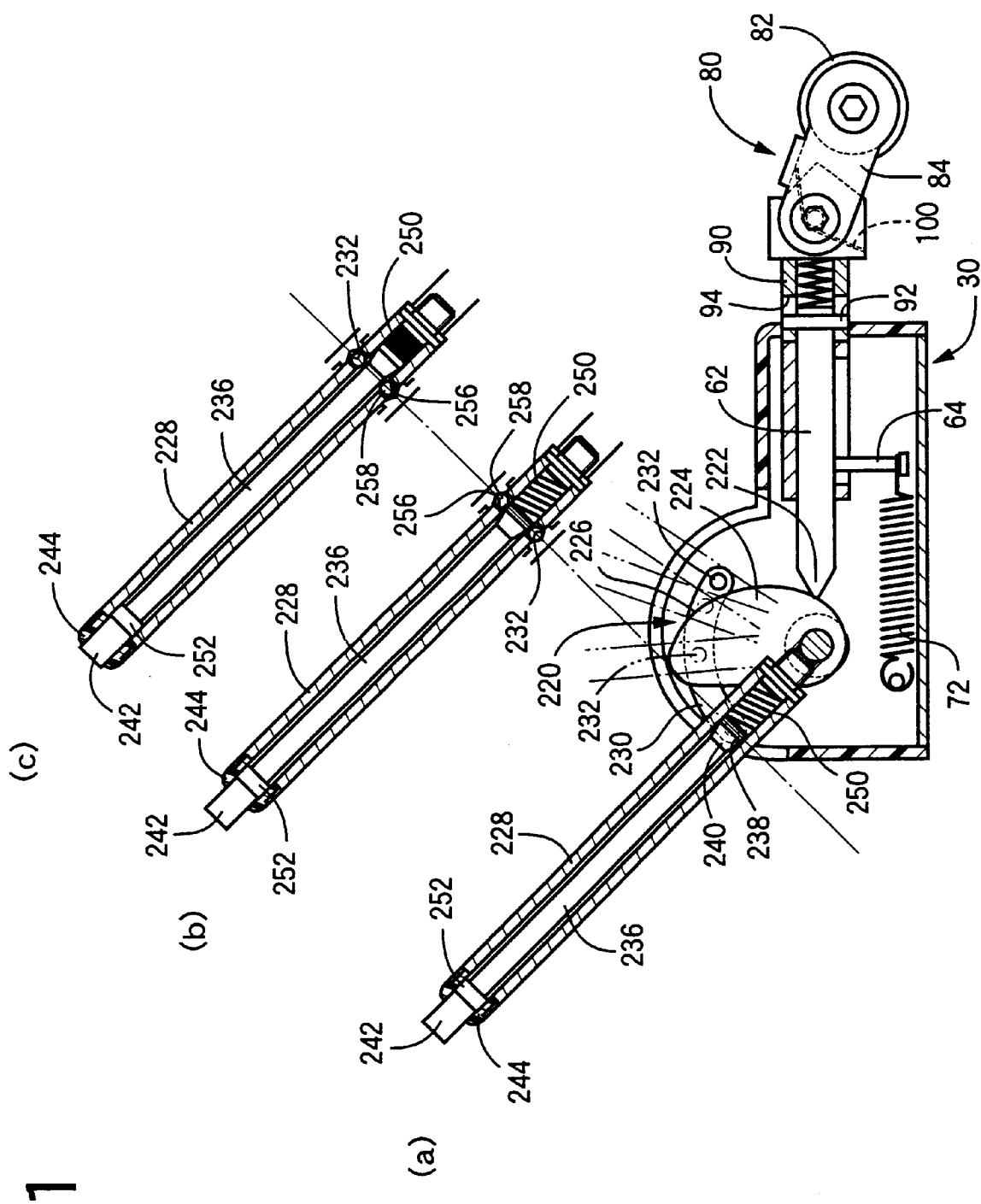
FIG. 11 is a front view partially cross section of a braking apparatus constructed according to a fourth embodiment of the invention.

Referring next to FIG. 11, there is shown a braking apparatus constructed according to a fourth embodiment of the invention. This braking apparatus of the fourth embodiment is characterized by including a positioning device 220 which is provided for positioning the movable member in the form of the rod 62 in a selected one of a plurality of predetermined positions, and then firmly holding the rod 62 in the selected position. In the braking apparatus of the fourth embodiment, the rod 62 has the cam follower portion in the form of a rear end portion 222 which is held in contact with a cam surface 226 of a cam 224. Unlike in the above-described first, second and third embodiments, the cam 224 does not have an engaging groove. Instead, a plurality of engaging recessed portions 232 are provided in the main body 30. Described more specifically, an engaging member 230 is provided to be fixed to each of the side wall portions 42 of the main body 30. The engaging member 230 consists of an arcuate plate which extends generally along an arc having its center at the pivot axis of an operating lever 228. The plurality of engaging recessed portions 232, each of which is defined by a conical surface, are formed in the engaging arcuate member 230. The engaging recesses portions 232 may be equi-angularly spaced apart from each other. However, in the present embodiment, the engaging recessed portions 232 are positioned in respective positions of the operating lever 228 which establish certain operating states of the braking apparatus. Thus, the angular spacing between each adjacent two of the recessed portions 232 is not necessarily constant.

The operating lever 228 consists of an elongated tubular member, and accommodates therein an operating rod 236 such that the operating rod 236 is movable in a longitudinal direction of the operating lever 228. The operating rod 236 has a large diameter portion 238 and a tapered portion 240 in its one of longitudinally opposite end portions that is closer to the cam 224. An operating terminal member in the form of an operating button 242 is fixed to the other longitudinally end portion of the operating rod 236. The operating button 242 is slidably fitted in a guide bushing 244 which is fixed to an opening end portion of the operating lever 228 that corresponds to an longitudinally distal end portion of the operating lever 228. The operating rod 236 is biased by a spring member in the form of the a compression coil spring 250 which is interposed between the operating rod 236 and the operating lever 228 and which constitutes a biasing device, in its reverse direction, i.e., in a direction toward the longitudinally distal end portion away from the longitudinally proximal end portion of the operating lever 228. A movement of the operating rod 236 in the reverse direction is limited by abutting contact of a large diameter portion 252 of the operating button 242 with a stepped or shoulder portion formed in an inner circumferential surface of the guide bushing 244.

The operating lever 228 has two radial holes 256 formed through its cylindrical wall and extending in its radial direction. The two radial holes 256 are positioned in respective positions which are diametrically opposed to each other and which correspond to the engaging arcuate plates 230. A movable engaging member in the form of a ball 258 is held in each of the radial holes 256, as shown in (b) and (c) of FIG. 11, such that a portion of the ball 258 can be protruded radially outwardly from the outer circumferential surface of the operating lever 228. The radial hole 256 consists of a tapered hole whose diameter decreases as the hole extends in the radially outward direction, and the smallest diameter of the radial hole 256 is made smaller than the diameter of the ball 258 for thereby preventing the ball 258 from being removed from the radial hole 256 in the radially outwardly direction. The large-diameter portion 238 of the operating rod 236 is positioned to be radially opposed to the radial holes 256 when the operating rod 236 is positioned in its reverse stroke end in which the large diameter portion 252 of the operating button 242 is in contact with the shoulder portion of the guide bushing 244. That is, the large diameter portion 238 of the operating rod 236 is brought into contact with the balls 258, so that the balls 258 are prevented from being radially inwardly displaced from their respective protruded positions at least when the operating rod 236 is positioned in the reverse stroke end, as shown in (b) of FIG. 11. When the operating button 242 is operated to be pressed into the guide bushing 244 against a biasing force of the compression coil spring 250, the operating rod 236 is moved in its forward direction so that the large-diameter portion 238 and the tapered portion 240 of the operating rod 230 are displaced to an axial position that is not radially opposed to the radial holes 256, as shown in (c) of FIG. 11. In this instance, since the large-diameter portion 238 and the tapered portion 240 are not in contact with the balls 258, each ball 258 is permitted to be moved to its retracted position in which any portion of the ball 258 is not protruded radially outwardly from the outer circumferential surface of the operating lever 228.

While the ball 258 is movable to the retracted position, the operating lever 228 can be pivoted to be positioned in a desired angular position. With the operating button 242 being released from the operator, the operating rod 236 biased by the compression coil spring 250 is moved in the reverse direction, whereby the tapered portion 240 of operating rod 236 is brought into contact with the balls 258, for thereby forcing the balls 258 toward their protruded positions. By pivoting the operating lever 228 over a small angle in the first or second direction, the balls 258 are brought into engagement with the nearest one of the engaging recessed portions 232 in a snap action manner, whereby the operating lever 228 is held in an angular position that corresponds to the recessed portion 232 engaged with the balls 258. In this state in which the large-diameter portion 238 of the operating rod 236 is positioned to be opposed to the radial holes 256, the balls 258 are inhibited to be moved toward their retracted positions, whereby the balls 258 are inhibited to be disengaged from the recessed portion 232, so that the operating lever 228 can not be pivoted from the above-described angular position in either of the first and second directions. In this state, even if the rod 62 is forced onto the cam surface 56 of the cam 52 by a reaction force of the tire 18, the cam 52 is not rotated and accordingly the rod 62 is not moved from the desired position. Thus, the braking apparatus can be held in its working state, even if the operating lever 228 is released from the operator. In other words, the present braking apparatus can be held in a desired working state, since the operating lever 228 is not pivoted as long as the operating button 242 is not pressed.

Figure 12:
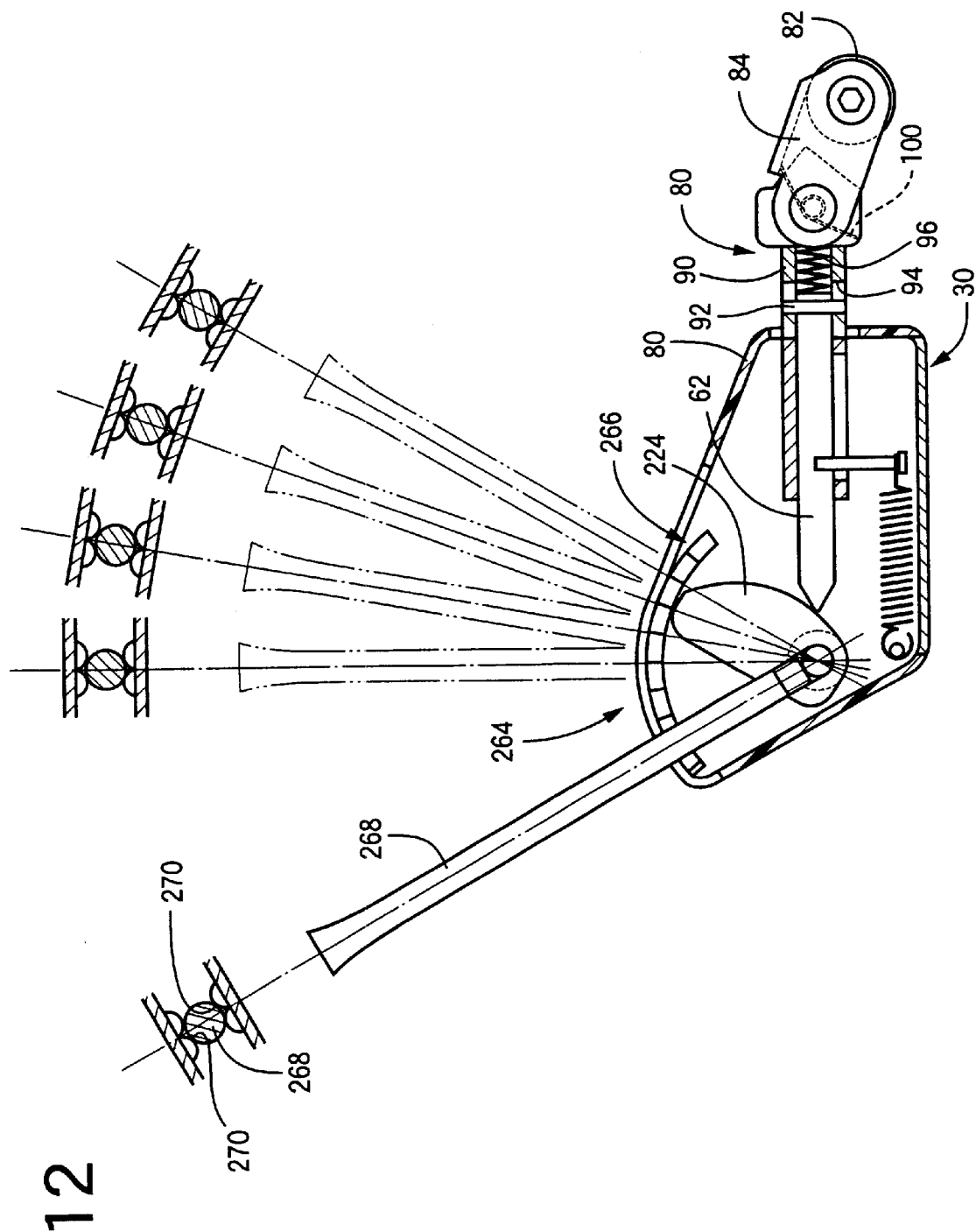
FIG. 12 is a front view partially cross section of a braking apparatus constructed according to a fifth embodiment of the invention.

Referring next to FIG. 12, there is shown a braking apparatus constructed according to a fifth embodiment of the invention. Like the braking apparatus of the fourth embodiment, the braking apparatus of the fifth embodiment is characterized by including the positioning device in the form of a positioning device 264. The positioning device 264 includes a plate spring 266 which serves as an elastic member and which is fixed to each one of the side wall portions 42 of the main body 30. The plate spring 266 consists of an arcuate plate which extends generally along an arc having its center at the pivot axis of an operating lever 268. A plurality of protruded portions are formed in the arcuate plate spring 266, so as to be arranged to be spaced apart from each other in a circumferential direction of the plate spring 266 and extend in a radial direction of the plate spring 266. With the formations of the protruded portions in the plate spring 266, there are provided a plurality of engaging recessed portions 270 each of which is located between circumferentially adjacent two of the protruded portions. The operating lever 268 has a shaft portion having a circular cross section.

During the pivot movement of the operating lever 268, the plate spring 266 is deformed to permit the shaft portion of the operating lever 268 to pass through the protruded portions so as to be engaged in a selected one of the engaging recessed portions 270. With this engagement of the shaft portion of the operating lever 268 with the selected engaging recessed portion 270, the operating lever 268 is held in an angular position that corresponds to the selected engaging recessed portion 270, and the cam 52 and the rod 62 are held in respective positions that correspond to the selected engaging recessed portion 270. The present braking apparatus has advantages that the positioning device 264 has a simplified construction and is accordingly easy to be manufactured at a reduced cost, and that the positioning device 264 is easy to be operated since the engagement of the operating lever 268 with the engaging recessed portions 270 can be easily released by simply operating the operating lever 268 with an operating force larger than a certain amount.

Figure 13:
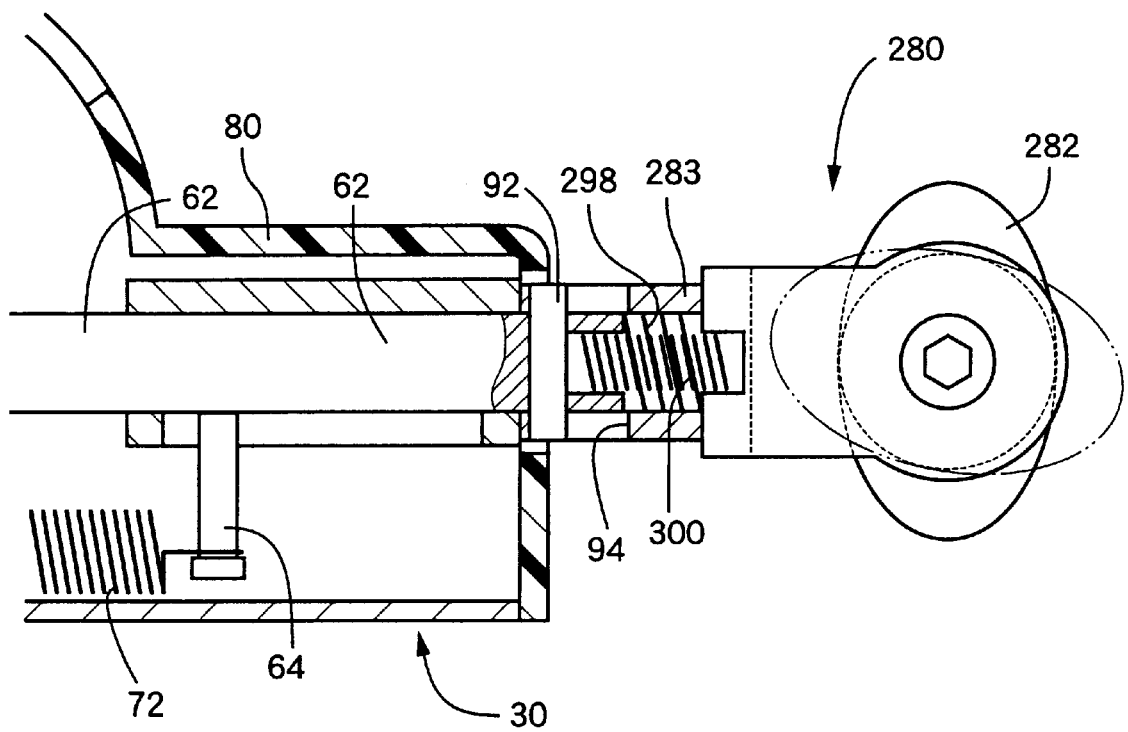
FIG. 13 is a front view partially cross section of a braking portion of a braking apparatus constructed according to a sixth embodiment of the invention.
Figure 14:
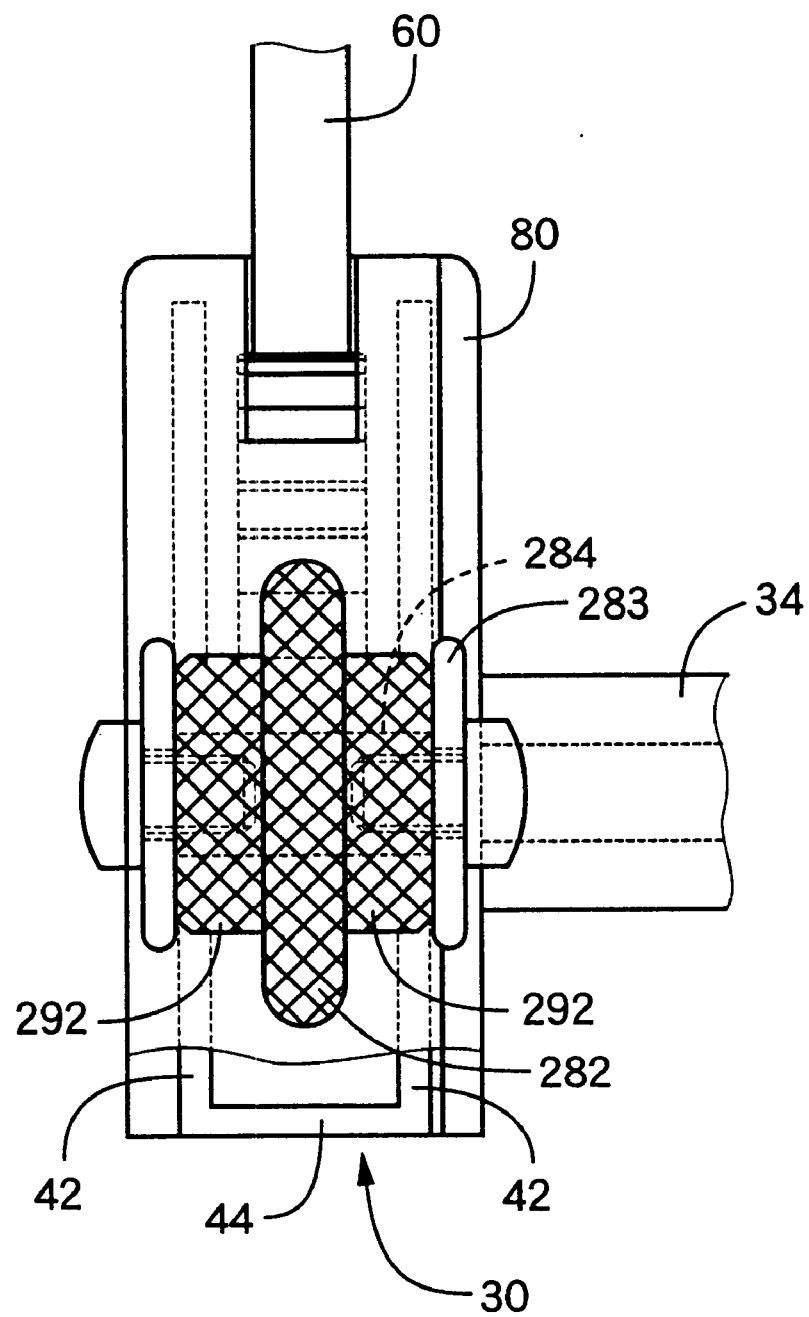
FIG. 14 is a side view of the braking apparatus of FIG. 13.
Figure 15:
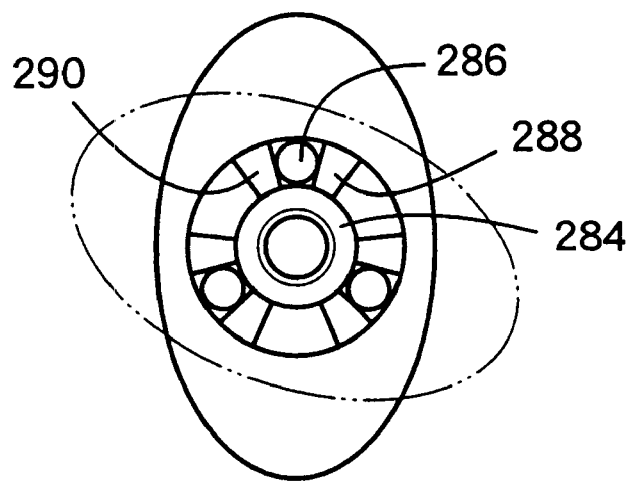
FIG. 15 is a view for explaining a cam of the braking apparatus of FIG. 13.
Figure 16:
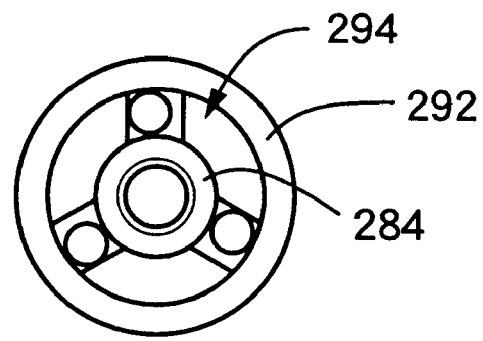
FIG. 16 is a view for explaining a braking member of the braking apparatus of FIG. 13.

Referring next to FIGS. 13–16, there is shown a braking apparatus constructed according to a sixth embodiment of the invention. This braking apparatus of the sixth embodiment is characterized in its braking portion in the form of a braking portion 280 which does not include the pivoting member 84 that is used in the braking apparatuses of the above-described embodiments. Instead, the braking portion 280 includes a cam 282 which is pivotable about an axis of a stationary shaft 284 that is held by a slide 283 so as not to be rotatable relative to the slide 283. The cam 282 is pivotable between its non-working state as indicated by a solid line and its working state as indicted by a two-dot chain line in FIG. 13. The cam 282 is rotatably held by the stationary shaft 282 through rollers 286, as shown in FIG. 15. Outwardly radial projections 288 are provided to project radially outwardly from the outer circumferential surface of the stationary shaft 284, while inwardly radial projections 290 are provided to project radially inwardly from the inner circumferential surface of the cam 282. Thus, the cam 282 is pivotable only between its non-working state in which the radial projections 288, 290 are in contact with each other though the rollers 286, and its working state in which the radial projections 288, 290 are in contact directly with each other.

A pair of braking members 292 are provided to be disposed on respective axially opposite sides of the cam 282, as shown in FIG. 14. Each braking member 292 has a rotation-resistance applying device 294 that is functionally equivalent to the rotation-resistance applying device 294 used in the braking apparatuses the above-described embodiments. This rotation-resistance applying device 294 does not include the reverse-rotation inhibiting device 114 used in the braking apparatuses of the above-described embodiments, since it is not necessary to prevent the braking member 292 from being rotated in the reverse direction. The cam 282 and the braking member 292 have respective outer circumferential surfaces in which small protrusions and recesses are provided by forming a knurling pattern therein. The cam 282 or/and the braking members 292 may include a radially outermost portion formed of a rubber of other material having a friction coefficient that is larger than that of a metallic material.

The slide 283 is attached to the rod 62 in a manner similar to the manner in that the slide 90 is attached to the rod 62 in the above-described embodiments. However, a maximum distance over which the slide 283 is movable relative to the rod 62 is made slightly larger than that over which the slide 90 is movable relative to the rod 62. Further, while the single compression coil spring 96 are interposed between the slide 90 and the rod 62 in the above-described embodiments, two compression coil springs are provided to be interposed between the slide 283 and the rod 62 in the present sixth embodiment. The two compression coil springs consist of a soft coil spring 298 and a hard coil spring 300 which has a spring constant larger than that of the soft coil spring 298. The soft coil spring 298 is adapted to be always compressed more or less irrespective of the change in the distance between the slide 283 and the rod 62, while the hard coil spring 300 is adapted to be compressed only when the distance the slide 283 and the rod 62 is smaller than a predetermined amount.

When the rod 62 is forwardly moved to such a position that causes the braking apparatus to be placed in the reverse-rotation inhibiting state, the cam 282 is brought into contact with the tire 18 by a relatively small biasing force of the soft coil spring 298, so that the cam 282 is held in its non-working position that is indicated by the solid line in FIG. 13. In this reverse-rotation inhibiting state, if the wheel 16 is about to be rotated in the reverse direction, the cam 282 is pivoted from its non-working position toward its working position that is indicted by the two-dot chain line. The pivot movement of the cam 282 toward the working position increases the distance from the axis of the cam 282 to a contact point at which the cam 282 and the tire 18 are in contact with each other. Since the rod 62 is inhibited from being moved in the reverse direction by at least one of the reverse-movement preventing device 130 and the positioning device 220 (or 264), the rod 62 is not moved in the reverse direction in spite of the increase in the distance between the axis of the cam 282 and the above-described contact point, whereby the cam 282 is made to strongly bite into the tire 18, for thereby inhibiting reverse rotation of the wheel 16.

When the rod 62 is further moved in the forward direction from the above-described position, the hard coil spring 300 also starts to be compressed, whereby the cam 282 and the braking members 292 are pressed onto the tire 18 by an increased pressing force, and the braking members 292 start to be rotated against the rotation resistance force provided by the rotation-resistance applying device 294. In this instance, the cam 282 slides or slips on the tire 18 since the cam 282 is not being rotated. However, the tire 18 is being radially inwardly deformed at a portion thereof forced by the braking members 292 that are disposed on the axially opposite sides of the cam 282, so that the cam 282 and the tire 18 are forced toward each other by a relatively small force, thereby making it possible to minimize an increase of a friction force generated by the sliding contact of the cam 282 with the tire 18. The wheel 16 is braked by the braking members 292 in the substantially same manner as in the above-described embodiments in which the wheel 16 is braked by the braking member 82, except that the forward rotation of the wheel 16 is locked by cooperation of the cam 282, the braking members 292 and the slide 283. That is, in the braking apparatus of the present sixth embodiment, the slide 283 is also brought into contact at its distal end portion with the tire 18 when the radially inward deformation of the above-described portion of the tire 18 is increased.

The cam 282 has a generally elliptic shape. It is possible to consider that one of longitudinally opposite end portions of the cam 282 (as viewed in a direction of the major axis of the elliptic-shaped cam 282) corresponds to the braking member, and that the other portions of the cam 282 correspond to the pivoting member. That is, in the braking apparatus of the present sixth embodiment, the braking member and the pivoting member provides a single piece in the form of the cam 282, and the soft coil spring 298 constitutes a biasing device which biases the braking member in a direction that causes the braking member to be brought into contact with the tire 18.

It is noted that the other of the longitudinally opposite end portions of the cam 282 can be used as the braking member, by turning the cam 282 over 1800 about the minor axis of the cam 282, where a part of the above-described one of the longitudinally opposite end portions which part is brought into contact with the tire 18 is worn as a result of service of the braking apparatus for a long time. Similarly, another part which is positioned symmetrically with the above-described part of the longitudinally end portion of the cam 282 with respect to the major axis of the cam 282 can be used as the braking member 282, by turning the cam 282 over 180° about the major axis of the cam 282.

Figure 17:
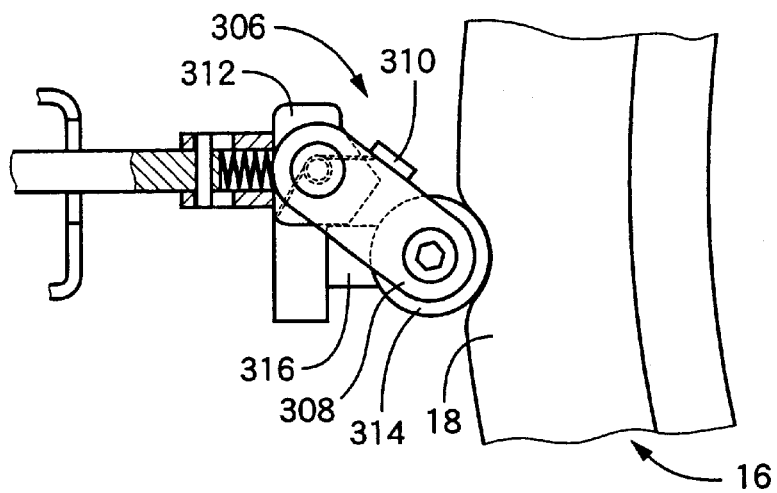
FIG. 17 is a front view partially cross section of a braking portion of a braking apparatus constructed according to a seventh embodiment of the invention.

Referring next to FIG. 17, there is shown a braking apparatus constructed according to a seventh embodiment of the invention. This braking apparatus of the seventh embodiment is characterized in its braking portion 306, wherein the pivot movement of a pivoting member 308 during the forward rotation of the wheel 16 is limited by abutting contact of a braking member 314 with a resistance applying member in the form of a friction member 316 that is fixed to a slide 312. That is, the pivot movement of the pivoting member 308 is limited by abutting contact of a stop portion 310 of the pivot member 308 with the slide 312 during the reverse rotation of the wheel 16, and is limited by the abutting contact of the braking member 314 with the friction member 316 during the forward rotation of the wheel 16. When the braking member 314 is held in contact with the friction member 316, the braking member 314 is pressed onto the friction member 316 by a pressing force whose amount is substantially equal to an amount of a pressing force by which the braking member 314 is pressed onto the tire 18. The friction member 316 applies a resistance force to the rotation of the braking member 314, wherein an amount of the resistance force is equal to a product of the pressing force (applied from the braking member 314 to the friction member 316) and a friction coefficient of the friction member 316. The amount of the resistance force applied from the friction member 316 to the braking member 314 increases with an increase in the pressing force by which the braking member 314 is pressed onto the tire 18. It is noted that the friction coefficient of the friction member 316 is adapted to be smaller than that of the tire 18, so that the braking member 314 starts to slip on the friction member 316 before the braking member 314 starts to slip on the tire 18. Thus, the rotation of the wheel 16 is braked by the braking member 316 while the braking member 316 is being rotated.

Figure 18:
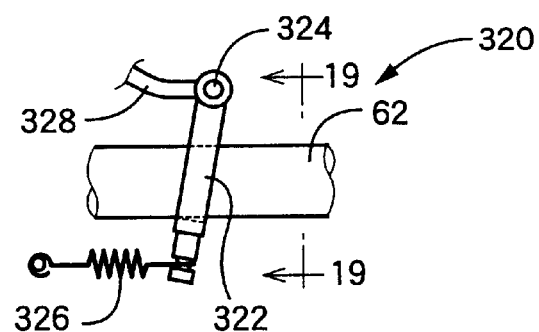
FIG. 18 is a front view of a reverse-movement preventing device of a braking apparatus constructed according to an eighth embodiment of the invention.
Figure 19:
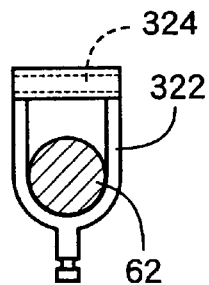
FIG. 19 is a cross sectional view taken along line 19—19 of FIG. 18.

Referring next to FIGS. 18 and 19, there is shown a braking apparatus constructed according to an eighth embodiment of the invention. This braking apparatus of the eighth embodiment includes a reverse-movement preventing device 320 which is a modification of the reverse-movement preventing device 130 that is shown in FIG. 2. While the reverse-movement preventing device 130 is designed to inhibit the reverse movement of the rod 62 by a pinch force applied from the pinch member 132 to the rod 62, this reverse-movement preventing device 320 is designed to inhibit the reverse movement of the rod 62 by a dead lock of an U-shaped dead lock lever 322 with he rod 62. The dead lock lever 322 is held by the main body 30 such that dead lock lever 322 is pivotable about the axis of a support shaft 324, and is biased by a tension coil spring 326 as an elastic member constituting a biasing device in a direction that causes the dead lock lever 322 to be pivoted in the reverse direction of the rod 62, whereby the dead lock lever 322 is brought into contact in an inner surface of its bottom portion with the outer circumferential surface of the rod 62, which is sidably fitted in the guide hole 54 of the guide member 46.

In this arrangement, the reveres movement of the rod 62 is prevented by a friction force acting between the rod 62 and the dead lock lever 322, while the dead lock lever 322 is held in contact with the rod 62 with a certain range of an angle of inclination of the lever 322 with respect to the rod 62 wherein the certain range varies as a function of a friction coefficient of the above-described inner surface of the bottom portion of the lever 322. When the rod 62 requires to be moved in the reverse direction, the dead lock lever 322 is pivoted over a small angle in the forward direction of the rod 62, for example, by operating a releasing arm 328 that is similar to the releasing arm 152 shown in FIG. 2. The braking apparatus of this eighth embodiment may be preferably equipped with an adjusting device which is operable to suitably change a direction in which the releasing arm 328 extends from the dead lock lever 322, or alternatively an adjusting device which is disposed in one of the grip member 170 and the releasing arm 328 and which is operable to suitably change en engaging position in that the grip member 170 and the releasing arm 328 are engaged with each other.

Figure 20:
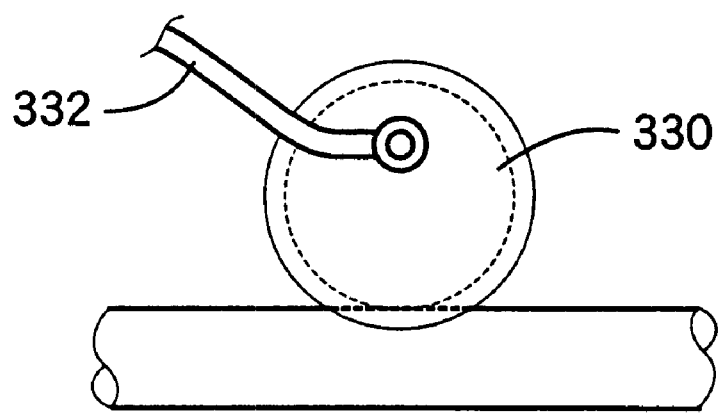
FIG. 20 is a front view partially cross section of a braking apparatus constructed according to a ninth embodiment of the invention.

Referring next to FIG. 20, there is shown a braking apparatus constructed according to a ninth embodiment of the invention, in which the reverse-movement preventing device, serving for inhibiting the reverse movement of the rod 62 from a desired position relative to the main body 30, may be constituted by a generally disk-shaped eccentric cam 330 pivotable about its pivot axis which is perpendicular to the axis of the rod 62 and which is not contained in any plains containing the axis of the rod 62, such that the outer circumferential surface of the eccentric cam 330 is brought into contact at its contact point with the outer circumferential surface of the rod 62. With application of a rotation moment to the eccentric cam 330 which causes a rotation of the eccentric cam 330 in such a direction that causes a movement of the contact point of the eccentric cam 330 in the reverse direction of the rod 62, the rod 62 is prevented from being moved in the reversed direction owing a dead lock of the eccentric cam 330 with the rod 62, which is caused when the rod 62 is about to be moved in the reverse direction. A releasing arm 332 is provided to be fixed to the eccentric cam 330, and a spring member is provided between the main body 30 and the releasing arm 332 (or the eccentric cam 330) such that the above-described rotation moment is generated by a biasing force of the spring member. The releasing arm 332 is adapted to be engageable with the grip member 170 or the like. The eccentric cam 330 has an annular groove formed in its outer circumferential surface and extending in the circumferential direction of the cam 330. The annular groove has a curved bottom surface whose radius of curvature substantially corresponds to a radius of the rod 62, so that the cam 330 and the rod 62 can be brought into contact at large contact surfaces thereof with each other.

Where the eccentric cam 330 is thus used as the reverse-movement preventing device, like where the dead lock lever 322 is used as the reverse-movement preventing device, the braking apparatus may be preferably equipped with an adjusting device which is operable to suitably change a direction in which the releasing arm 332 extends from the eccentric cam 330, or alternatively an adjusting device which is disposed in one of the grip member and the releasing arm 332 and which is operable to suitably change en engaging position in that the grip member and the releasing arm 332 are engaged with each other.

Figure 21:
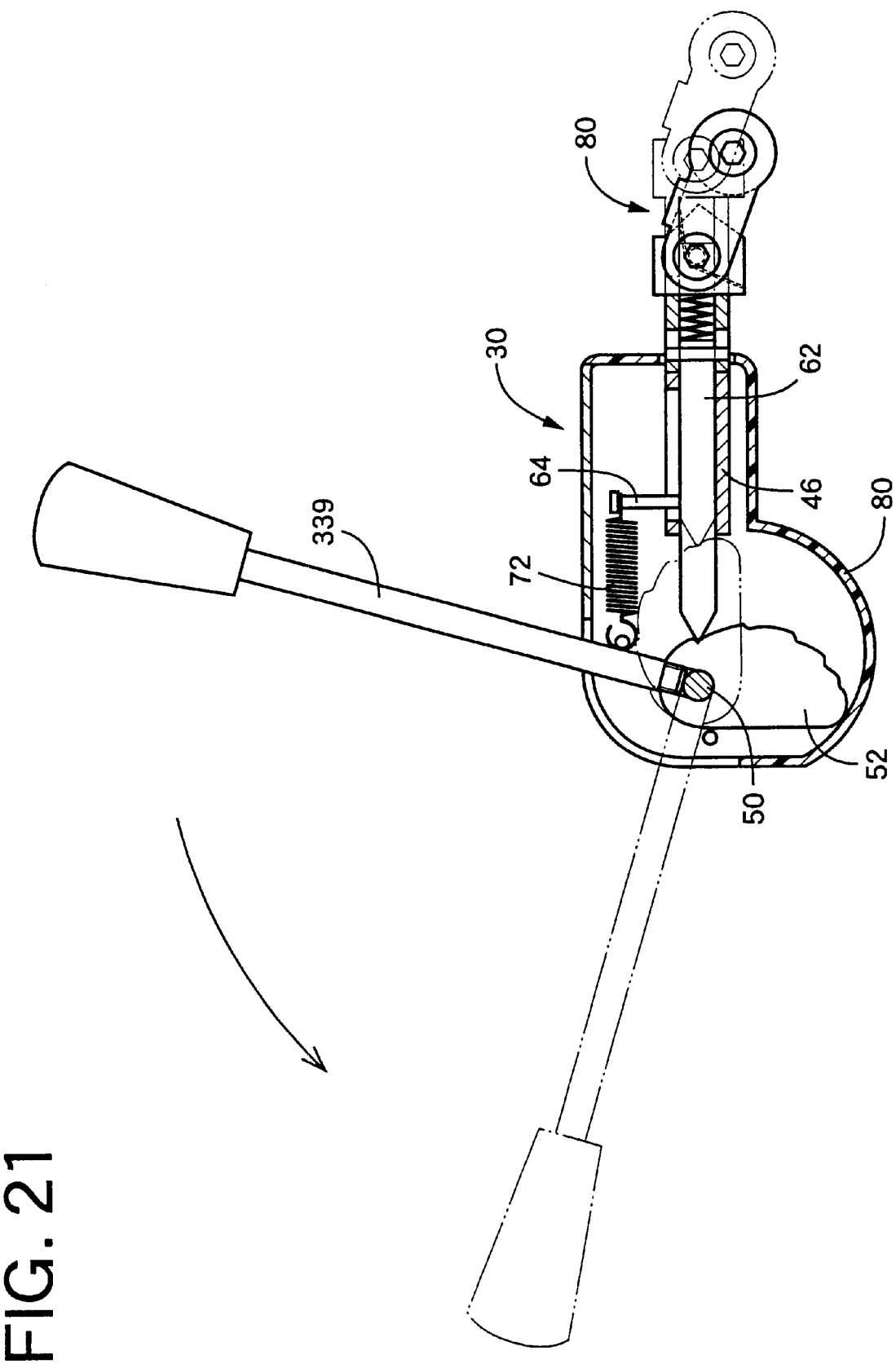
FIG. 21 is a front view partially cross section of a braking apparatus constructed according to a tenth embodiment of the invention.
Figure 22:
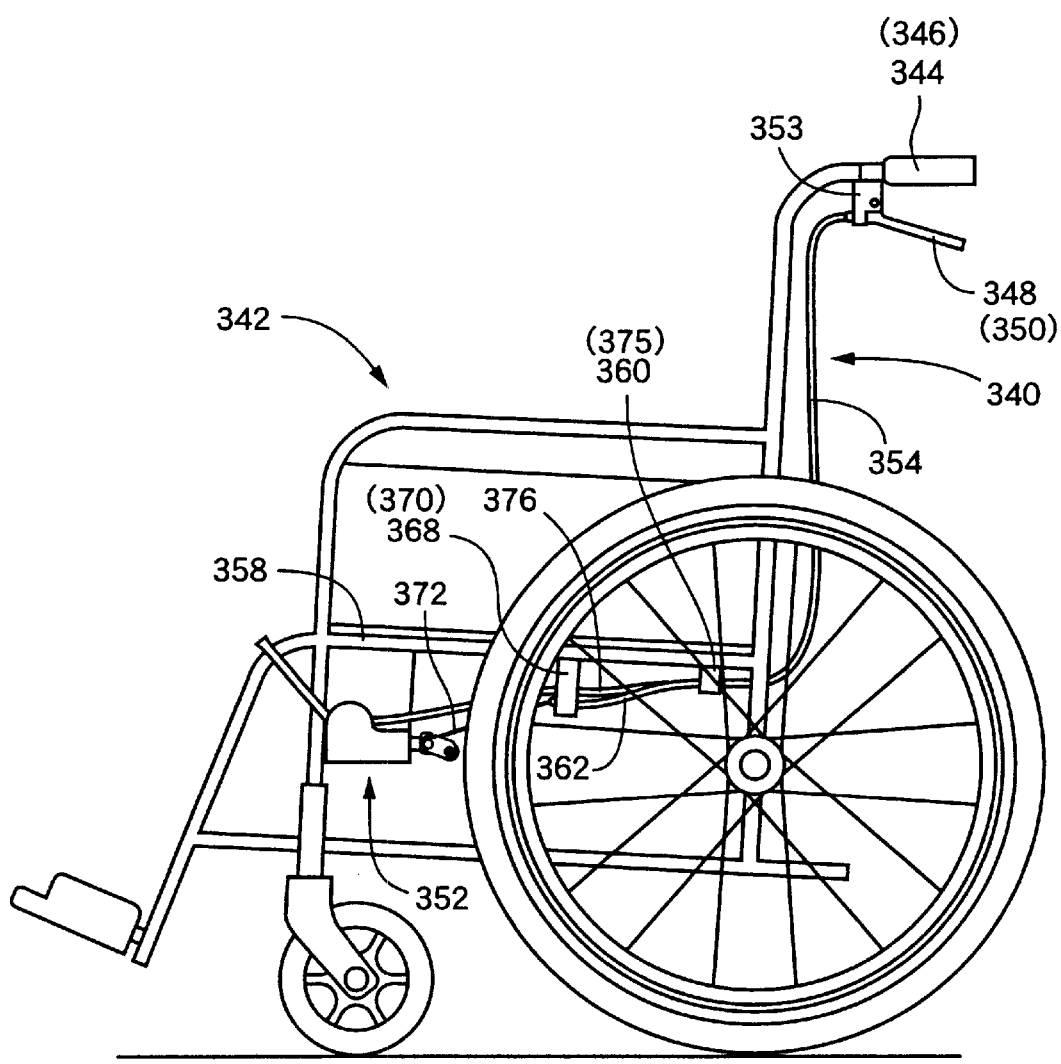
FIG. 22 is a side view of a wheelchair which is equipped with a braking system constructed according to an eleventh embodiment of the invention.
Figure 23:
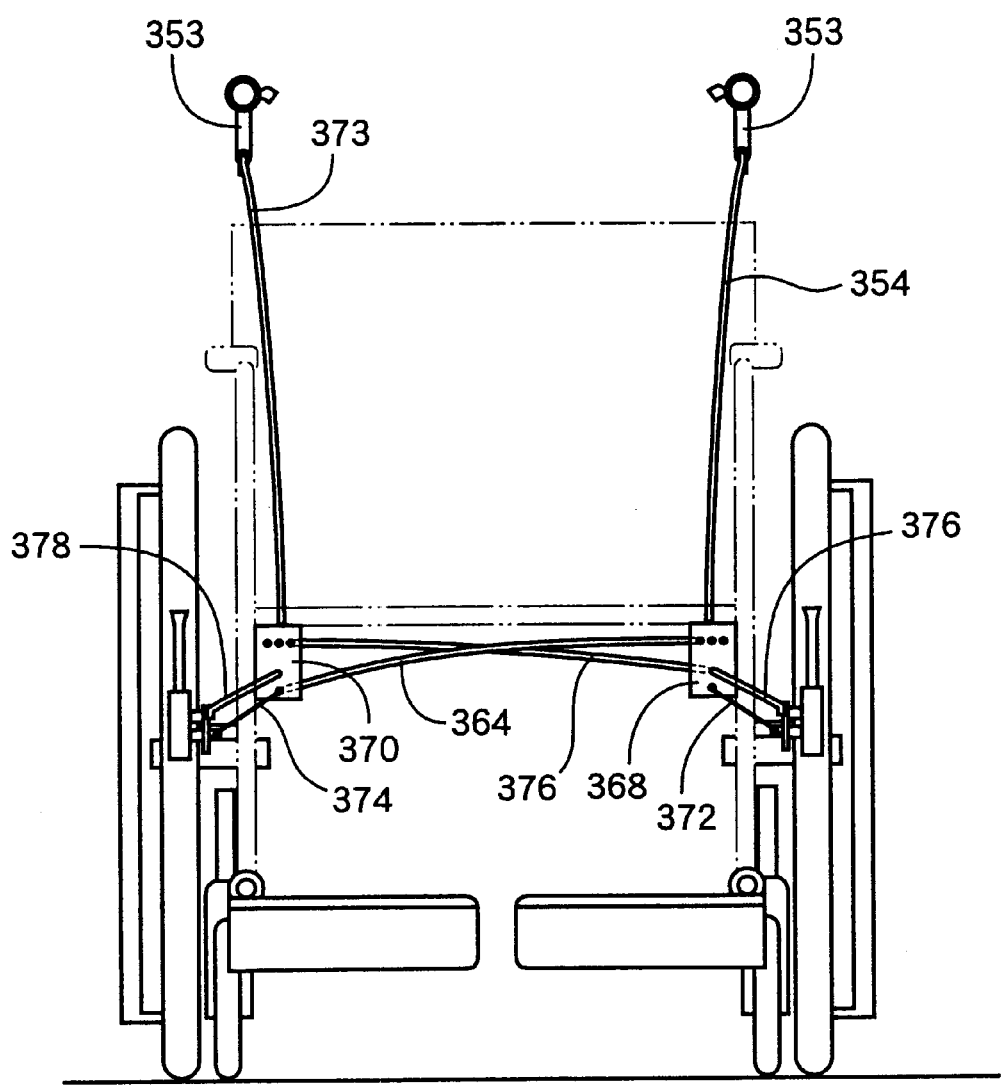
FIG. 23 is a front view of the wheelchair of FIG. 22.

Referring next to FIG. 21, there is shown a braking apparatus constructed according to a tenth embodiment of the invention. This braking apparatus of the ninth embodiment is characterized in a direction in which an operating lever 339 is operated. The braking apparatus of the above-described embodiments is placed in its working state, with the operating lever being pulled backwardly by the user of the wheelchair 12 so as to be pivoted in the clockwise direction as viewed in the figures. The braking apparatus of the ninth embodiment is placed in its working state, with the operating lever being pushed forwardly by the user so as to be counter-clockwise pivoted from its home position indicated by a solid line toward its fully working position indicated by a two-dotted chain line as shown in FIG. 21. That is, in the present braking apparatus, the first and second directions of the operating lever correspond to the counter-clockwise direction and the clockwise direction as viewed in FIG. 21. This braking apparatus is easily operable by the user even if the user has an injury in his or her spinal code or a difficulty in pulling the operating lever with a required force. This braking apparatus has a construction that is a slight modification of the construction of the braking apparatus of the second embodiment shown in FIG. 8. However, each of the braking apparatuses of the other embodiments can be similarly modified such that the braking apparatus is adapted to be placed in its working state by forwardly pushing the operating lever as in this braking apparatus of the ninth embodiment.

Referring next to FIGS. 22–26, there is shown a braking system 340 constructed according to an eleventh embodiment of invention. This braking system 340 is designed to be operable not only by the user (disabled person) of a wheelchair 342 but also by a helper(who walks together with the wheelchair 12). The braking system 340 includes a braking apparatus 352 identical in construction with the braking apparatus of the third embodiment shown in FIGS. 9 and 10. In the third embodiment, each of the braking apparatuses 352 which are provided for braking the respective right and left wheels 16 is placed in its working state in response to the helper's operation of the corresponding one of the two operating members provided in respective right and left handles of the wheelchair 12. In the present eleventh embodiment, the right and left braking apparatuses 352 are both placed in their respective working states in response to an operation of one of the operating members in the form of two operating levers 350, 348 provided in respective right and left handles 346, 344, while the right and left braking apparatuses 352 are both placed in their non-working states in response to an operation of the other of the operating levers 350, 348.

The present braking system 340 will be further explained, on the assumption that the braking apparatuses 352 are held in the working states when the right operating lever 350 is operated and are held in the non-working states when the left operating lever 348 is operated.

Figure 24:
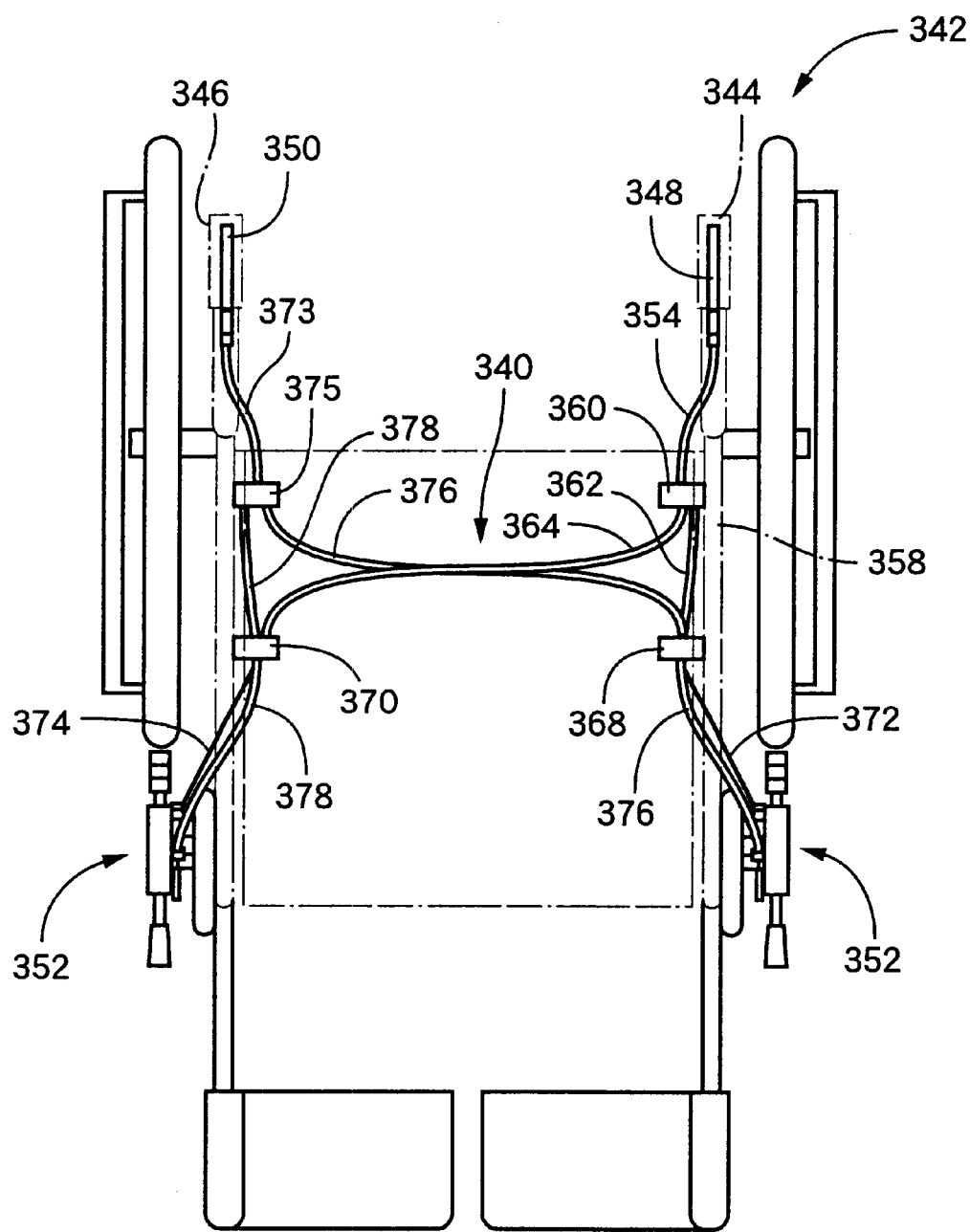
FIG. 24 is a plan view of the wheelchair of FIG. 22.

The left operating lever 348 is pivotably held by a left support member 353. An outer tube 354 is fixed at one of opposite end portions to the left support member 353, and is fixed at the other end portion to a left-sided first relay member 360 that is fixed to a portion of a frame 358 of the wheelchair 342, which portion is located under a rear left portion of a seat of the wheelchair 342. Two outer tubes 362, 364 extend from the left-sided first relay member 360, and are respectively fixed to a left-sided second relay member 368 and a right-sided second relay member 370, as shown in FIG. 24 The left-sided second relay member 368 and the right-sided second relay member 370 are fixed to respective portions of the frame 358 which are located under an intermediate left portion and an intermediate right portion of the seat, respectively. A main wire cable is connected at one of opposite end portions thereof to the left operating lever 348, and is guided by the outer tube 354 so as to be introduced at the other end portion into the left-sided first relay member 360. Two branch wire cables 372, 374, which branch from the main wire cable in the left-sided first relay member 360, are respectively guided by the outer tubes 362, 364, and then project forwardly from the respective left-sided and right-sided second relay members 368, 370.

Figure 25:
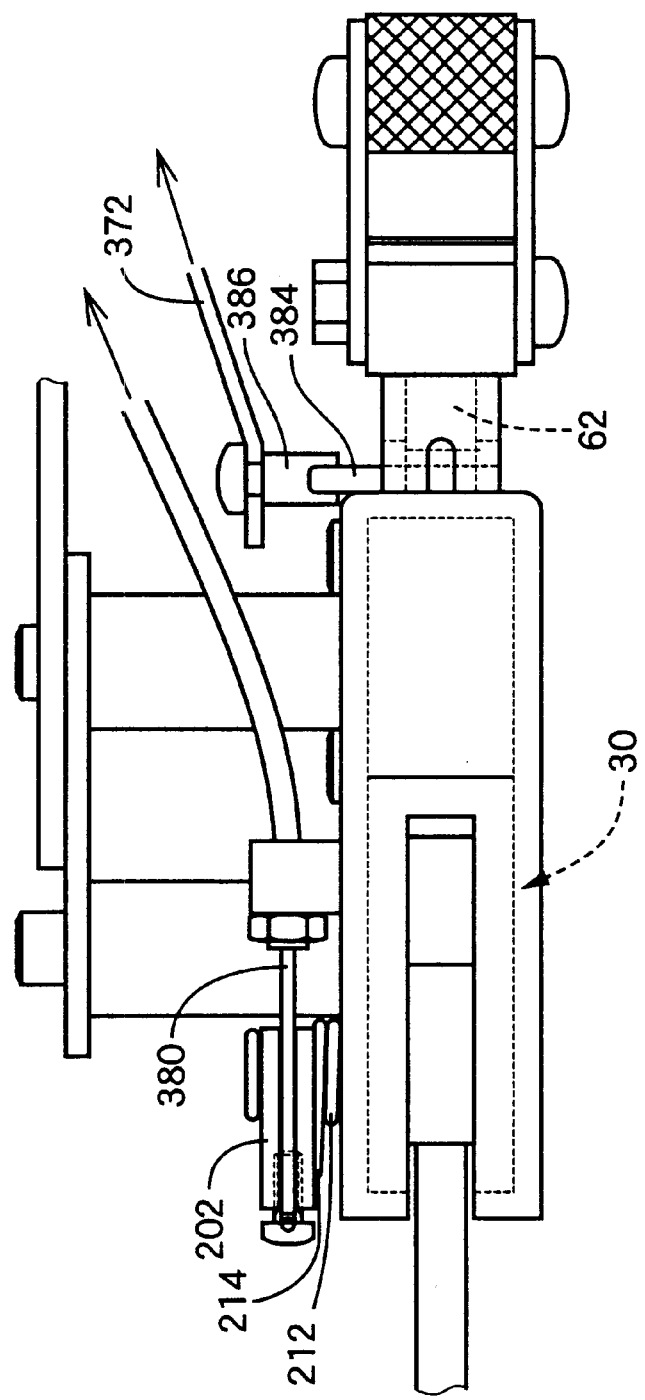
FIG. 25 is a plan view of a braking apparatus of the braking system of FIG. 22.
Figure 26:
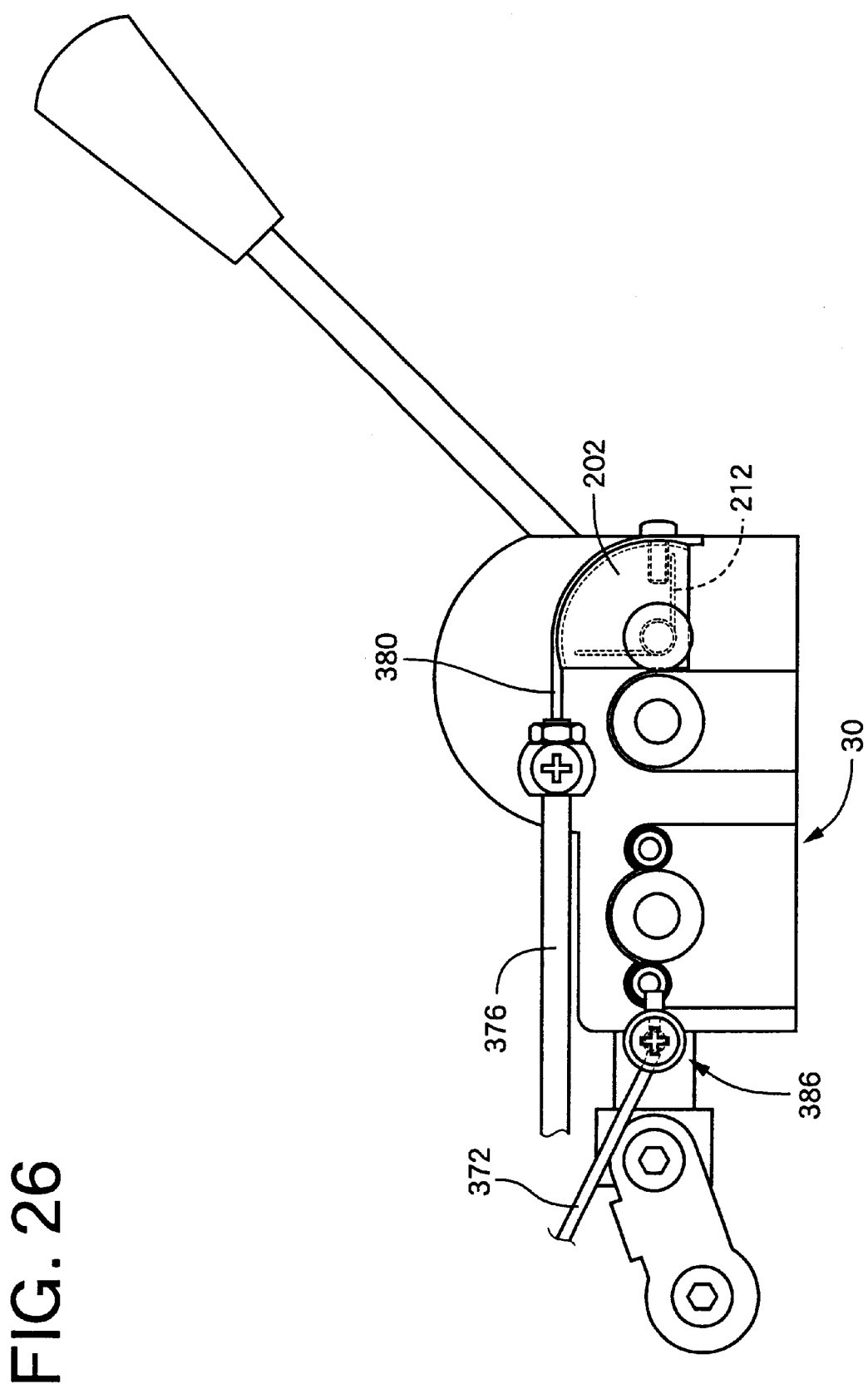
FIG. 26 is a rear view of the braking apparatus of the braking system of FIG. 22.

Similarly, the right operating lever 350 is pivotably held by a right support member 353. An outer tube 373 is provided to be disposed between the right support member 353 and a right-sided first relay member 375. Two outer tubes 376, 378 extend from the right-sided first relay member 375, and pass through the respective left-sided and right-sided second relay members 368, 370 so as to be fixed at their respective end portions to the main bodies 30, 30 of the left and right braking apparatuses 352, 352, respectively, as shown in FIGS. 25 and 26. A main wire cable is connected at one of opposite end portions thereof to the right operating lever 350, and is guided by the outer tube 373 so as to be introduced at the other end portion into the right-sided first relay member 375. Two branch wire cables (one of which is designated by the reference numeral 380 as shown in FIGS. 25 and 26), which branch from the main wire cable in the right-sided first relay member 375, are respectively guided by the outer tubes 376, 378, and then connected at their end portions to the pulleys 202, 202 of the left and right braking apparatuses 352, 352.

The branch wire cable 372 projects forwardly from the left-sided second relay member 368, and is connected at its end portion to the rod 62 of the left braking apparatus 352, as shown in FIG. 25. A pin 384 is provided to be fixed to the outer circumferential surface of the rod 62 such that the pin 384 is held perpendicular to the. axis of the rod 62. The branch wire cable 372 is fixed at the end portion to a clamping device 386 provided in the pin 384. Similarly, the branch wire cable 374 is fixed at its end portion to the rod 62 of the right braking apparatus 352. The pulley 202 of each of the right and left braking apparatuses 352, 352 is biased by the torsion coil spring 214 in such a direction that would causes the pulley 202 to be rotated in one of opposite directions that would cause the braking apparatus 352 to be placed in its non-working state.

In the braking system 340 constructed as described above, the pulley 202 and the cam 52 of each of the right and left braking apparatuses 352, 352 are rotated by the operation of the right operating lever 350 so that the rod 62 of each braking apparatus 352 is moved in the forward direction whereby each braking apparatus 352 is placed in its working state. By the operation of the left operating lever 348, the rod 62 of each braking apparatus 352 is pulled in the forward direction whereby the engaging projection 70 of the rod 62 is disengaged from the engaging groove 192 of the cam 52. As a result of the disengagement of the engaging projection 70 of the rod 62 from the engaging groove 192 of the cam 52, the pulley 202 and the cam 52 are rotated by the biasing force of the torsion coil spring 214 in the above-described one of the opposite directions that would cause the braking apparatus 352 to be placed in its non-working state. Then, when the left operating lever 348 is released, the rod 62 is moved in the reverse direction by the biasing force of the tension coil spring 72, so that the rod 62 is held in contact with the cam surface 56 of the cam 52 whereby the braking apparatus 352 is completely placed in its non-working state.

The braking system 340 of the present tenth embodiment advantageously has a simple constriction in which the two working-state-placing branch wire cables (for placing the respective apparatuses 352, 352 in their working states) and the two non-working-state-placing branch wire cables (for placing the respective apparatuses 352, 352 in their non-working states) simply branch from the respective main wire cables. In this construction, however, the lengths of the respective branch wire cables require to be accurately adjusted such that the right and left braking apparatuses 352, 352 provide substantially equal braking effects. That is, the length of one of the two working-state-placing branch wire cables has to be adjusted relative to the length of the other working-state-placing branch wire cable, so that the right and left braking apparatuses 352, 352 are simultaneously placed in their working states and provide respective braking forces equal to each other.

Such an adjustment would be no longer necessary if the braking system 340 is provided with an equalizing device serving for equalizing forces that are applied to the respective working-state-placing branch wire cables, to each other. The equalizing device to be used in the present braking system 340 may consist of a known device used in parking braking systems of auto vehicles or other systems. For example, the equalizing device may have a simple structure, in which the main wire cable projecting from the operating lever 350 is connected to a longitudinally central position of a bar while the working-state-placing branch wire cables are connected to respective longitudinally opposite end positions that are distant from the longitudinally central position of the bar by respective distances equal to each other. It is more preferable that the braking system 340 is provided with another equalizing device serving for equalizing forces that are applied to the respective non-working-state-placing branch wire cables, to each other.

It is to be understood that the present invention may be embodied with various other changes, modifications and improvements, such as those described in the SUMMARY OF THE INVENTION, which may occur to those skilled in the art, without departing from the spirit and scope of the invention defined in the following claims.

What is claimed is:

1. A braking apparatus for braking a wheel of a vehicle, comprising:
   a main body;
   a cam which is supported by said main body such that said cam is rotatable about an axis thereof, and which has a cam surface whose distance from said axis changes as viewed in a circumferential direction of said cam;
   a movable member which is held by said main body such that said movable member is movable relative to said main body, and which holds a cam follower portion engaging said cam surface, and a braking portion brought into contact with a tire of the wheel;
   an operating device which includes an operating member operable to be moved in first and second directions, and which rotates said cam in one of opposite directions in response to the movement of said operating member in said first direction, for thereby moving said movable member in a forward direction that causes said braking portion to be displaced toward the tire, and rotates said cam in the other of said opposite directions in response to the movement of said operating member in said second direction, for thereby moving said movable member in a reverse direction that is opposite to said forward direction; and
   a reverse-movement preventing device which prevents the movement of said movable member in said reverse direction,
   wherein said reverse-movement preventing device includes a positioning device which positions said movable member in a selected one of a plurality of predetermined positions relative to said main body, and holds said movable member in the selected position.

2. A braking apparatus according to claim 1, wherein said positioning device includes a first engaging portion which is provided in one of said cam surface and said cam follower portion, and a second engaging portion which is provided in the other of said cam surface and said cam follower portion and which is engageable with said first engaging portion, and wherein one of said first and second engaging portions consists of a plurality of engagers which are selectively brought into engagement with the other of said first and second engaging portions.

3. A braking apparatus according to claim 2, wherein said first engaging portion and said second engaging portion are provided in said cam surface and said cam follower portion, respectively, wherein said first engaging portion consists of said plurality of engagers in the form of a plurality of engaging grooves formed in said cam surface and extending in parallel with said axis, and wherein said second engaging portion consists of an engaging projection formed in said cam follower portion and having a shape complementary to that of each of said engaging grooves.

4. A braking apparatus according to claim 1, wherein said operating member consists of an operating lever which is supported by said main body such that said operating lever is pivotable about a pivot axis thereof, wherein said positioning device includes an engaging protruded portion which is provided in one of said main body and said operating lever, and an engaging recessed portion which is provided in the other of said main body and said operating lever and which is engageable with said engaging protruded portion, and wherein one of said engaging protruded and recessed portions consists of a plurality of engagers which are selectively brought into engagement with the other of said engaging protruded and recessed portions, so that said movable member is held in one of said plurality of predetermined positions.

5. A braking apparatus according to claim 1, wherein said operating member consists of an operating lever which is supported by said main body such that said operating lever is pivotable about a pivot axis thereof, wherein said positioning device includes an engaging protruded portion which is provided in one of said main body and a member pivotable together with said operating lever, and an engaging recessed portion which is provided in the other of said main body and said member pivotable together with said operating lever and which is engageable with said engaging protruded portion, and wherein one of said engaging protruded and recessed portions consists of a plurality of engagers which are selectively brought into engagement with the other of said engaging protruded and recessed portions, so that said movable member is held in one of said plurality of predetermined positions.

6. A braking apparatus according to claim 4, wherein said positioning device further includes an elastic member, and wherein said engaging protruded and recessed portions are held in engagement with each other owing to an elastic force provided by said elastic member, said engagement being permitted to be released by elastic deformation of said elastic member which is caused when an amount of a force applied to said elastic member exceeds a predetermined threshold.

7. A braking apparatus according to claim 6, wherein said engaging recessed portion is provided by a plate spring which is bent, so that said engaging protruded portion is permitted to be released from said engaging recessed portion by elastic deformation of said plate spring.

8. A braking apparatus according to claim 7, wherein said operating lever includes a shaft portion having a circular shape in a transverse cross section thereof, and wherein said engaging protruded portion is provided by said shaft portion of said operating lever.

9. A braking apparatus according to claim 4, wherein said positioning device further includes a biasing device, and wherein said engaging protruded portion consists of a protruded portion of a movable engaging member which is held by said one of said main body and said operating lever such that said movable engaging member is movable between a projected position and a retracted position thereof and is biased by said biasing device in a direction toward said projected portion away from said retracted position.

10. A braking apparatus according to claim 1, wherein said positioning device includes:
- a movable engaging member which is held by said operating member such that said movable engaging member is movable between a projected position and a retracted position thereof
- a switching device which is provided in said operating member, and which is operable to selectively establish a retraction permitting state in which said movable engaging member is permitted to be moved to said retracted position, and a retraction inhibiting state in which said movable engaging member is inhibited from being moved to said retracted position; and
- a plurality of engaging recessed portions which are provided in respective portions of said main body, and which are selectively brought into engagement with a protruded portion of said movable engaging member when said movable engaging member is held in said projected position, for thereby holding said movable member in the selected one of said plurality of predetermined positions and inhibiting movement of said movable member relative to said main body from the selected position.

11. A braking apparatus according to claim 10, wherein said operating member consists of an operating lever which has an elongated tubular shape and which is pivotable about an pivot axis thereof that is perpendicular to an longitudinal direction thereof, and wherein said switching device includes:
- an operating rod which is disposed within said operating lever such that said operating rod is movable in said longitudinal direction of said operating lever, between first and second longitudinal positions thereof which are closer to longitudinally distal and proximal end portions of said operating lever, respectively;
- a biasing device which biases said operating rod toward said first longitudinal position away from said second longitudinal position;
- an operating terminal portion which is provided in one of opposite end portions of said operating rod that is closer to said longitudinally distal end portion of said operating lever, and which is operable to move said operating rod toward said longitudinally proximal end portion away from said longitudinally distal end portion, against a biasing force provided by said biasing device; and
- a working portion which is provided in the other of said opposite end portions of said operating rod, and which inhibits the movement of said movable engaging member toward said retracted position at least when said operating rod is held by said biasing force in said first longitudinal position, and permits said movement of said movable engaging member toward said retracted position when said operating rod is moved by the operation of said operating terminal portion, toward said second longitudinal position away from said first longitudinal position.

12. A braking apparatus according to claim 1, wherein said movable member is held by said main body such that said movable member is movable relative to said main body along a line that is perpendicular to said axis of said cam, and wherein said cam follower portion and said braking portion are held by a rear end portion and a front end portion of said movable member, respectively.

13. A braking apparatus according to claim 12, wherein said cam consist of a plate cam, and wherein said cam surface is provided by an outer circumferential surface of said plate cam.

14. A braking apparatus according to claim 13, wherein said movable member consists of a rod which is brought into sliding contact at a rear end portion thereof with said cam surface so that said rear end portion serves as said cam follower portion.

15. A braking apparatus according to claim 1, wherein said operating member consists of an operating lever which is attached at a longitudinal end portion thereof to said cam and is pivotable together with said cam about said axis of said cam.

16. A braking apparatus for braking a wheel of a vehicle, comprising:
- a main body;
- a cam which is supported by said main body such that said cam is rotatable about an axis thereof, and which has a cam surface whose distance from said axis changes as viewed in a circumferential direction of said cam;
- a movable member consisting of a rod which is held by said main body such that said movable member is movable relative to said main body, and which holds a cam follower portion engaging said cam surface, and a braking portion brought into contact with a tire of the wheel;
- an operating device which includes an operating member operable to be moved in first and second directions, and which rotates said cam in one of opposite directions in response to the movement of said operating member in said first direction, for thereby moving said movable member in a forward direction that causes said braking portion to be displaced toward the tire, and rotates said cam in the other of said opposite directions in response to the movement of said operating member in said second direction, for thereby moving said movable member in a reverse direction that is opposite to said forward direction; and
- a reverse-movement preventing device which prevents the movement of said rod in said reverse direction, wherein said movable member is held by said main body such that said movable member is movable relative to said main body along a line that is perpendicular to said axis of said cam, and wherein said cam follower portion and said braking portion are held by a rear end portion and a front end portion of said movable member, respectively, and wherein said reverse-movement preventing device includes:
- a pinch member including a first contact portion which is opposed to a first portion of an outer circumferential surface of said rod and which is spaced apart from said first portion by a predetermined distance, and a second contact portion which is opposed to a second portion of said outer circumferential surface of said rod that portion is opposite to said first portion and which is spaced apart from said second portion by a predetermined distance, said pinch member being held, at a portion thereof adjacent to one of said first and second contact portions, by said main body such that said pinch member is pivotable about a pivot axis thereof that is perpendicular to a longitudinal direction of said rod;
- a torque applying device which applies a torque to said pinch member such that said pinch member is pivoted by said torque in such a direction that causes said first and second contact portions of said pinch member to be displaced in a direction toward said rear end portion of said movable member away from said front end portion of said movable member; and
a releasing device which is operable to pivot said pinch member against said torque applied by said torque applying device.

17. A braking apparatus according to claim 16, wherein said operating member consists of an operating lever which is pivotable about an pivot axis thereof, and wherein said releasing device includes:
a releasing lever which is disposed pivotably about a pivot axis thereof that is not parallel with said longitudinal direction of said rod, and which is operable to be pivoted so as to pivot said pinch member;
a grip member which is disposed in a longitudinally distal end portion of said operating lever such that said grip member is movable relative to said operating lever in a longitudinal direction of said operating lever, and which is operable to be moved in said longitudinal direction, so as to be engaged with said releasing lever for thereby pivoting said releasing lever; and
a biasing device which is interposed between said grip member and said operating lever, and which biases said grip member in a direction away from said releasing lever.

18. A braking apparatus for braking a wheel of a vehicle, comprising:
a main body;
a cam which is supported by said main body such that said cam is rotatable about an axis thereof, and which has a cam surface whose distance from said axis changes as viewed in a circumferential direction of said cam;
a movable member consisting of a rod which is held by said main body such that said movable member is movable relative to said main body, and which holds a cam follower portion engaging said cam surface, and a braking portion brought into contact with a tire of the wheel; and
an operating device which includes an operating member operable to be moved in first and second directions, and which rotates said cam in one of opposite directions in response to the movement of said operating member in said first direction, for thereby moving said movable member in a forward direction that causes said braking portion to be displaced toward the tire, and rotates said cam in the other of said opposite directions in response to the movement of said operating member in said second direction, for thereby moving said movable member in a reverse direction that is opposite to said forward direction;
wherein said operating member consists of an operating lever which is attached at a longitudinal end portion thereof to said cam and is pivotable together with said cam about said axis of said cam,
and wherein said cam has a hole formed therein and extending in perpendicular to said axis of said cam, and wherein said longitudinal end portion of said operating lever is accommodated in said hole so that said operating lever is fixed to said cam.

19. A braking apparatus for braking a wheel of a vehicle, comprising:
a main body;
a cam which is supported by said main body such that said cam is rotatable about an axis thereof, and which has a cam surface whose distance from said axis changes as viewed in a circumferential direction of said cam;
a movable member consisting of a rod which is held by said main body such that said movable member is movable relative to said main body, and which holds a cam follower portion engaging said cam surface, and a braking portion brought into contact with a tire of the wheel; and
an operating device which includes an operating member operable to be moved in first and second directions, and which rotates said cam in one of opposite directions in response to the movement of said operating member in said first direction, for thereby moving said movable member in a forward direction that causes said braking portion to be displaced toward the tire, and rotates said cam in the other of said opposite directions in response to the movement of said operating member in said second direction, for thereby moving said movable member in a reverse direction that is opposite to said forward direction;
wherein said braking portion includes:
a braking member which is rotatable about an axis thereof; and
a reverse-rotation inhibiting device which inhibits rotation of said braking member in one of opposite directions while permitting rotation of said braking member in the other of said opposite directions.

20. A braking apparatus for braking a wheel of a vehicle, comprising:
a main body;
a movable member which is held by said main body such that said movable member is movable relative to said main body, and which includes a braking portion brought into contact with a tire of the wheel; and
an operating device which includes an operating member, and which is operable to move said braking portion toward and away from the tire of the wheel in response to an operation of said operating member,
wherein said braking portion includes:
a braking member which is rotatable about an axis thereof; and
a reverse-rotation inhibiting device which inhibits rotation of said braking member in one of opposite directions while permitting rotation of said braking member in the other of said opposite directions.

21. A braking apparatus according to claim 20, further comprising a rotation-resistance applying device which applies a resistance to the rotation of said braking member in said other of said opposite directions.

22. A braking apparatus according to claim 21, wherein said rotation-resistance applying device constitutes a part of said reverse-rotation inhibiting device, so that said reverse-rotation inhibiting device applies the resistance to the rotation of said braking member in said other of said opposite directions although permitting said rotation of said braking member in said other of said opposite directions.

23. A braking apparatus according to claim 22, wherein an amount of said resistance applied by said rotation-resistance applying device to the rotation of said braking member increases with an increase of an amount of a pressing force by which said braking member is pressed onto the tire of the wheel.

24. A braking apparatus according to claim 23, wherein said rotation-resistance applying device includes a resistance applying member which is brought into pressing contact with said baking member by a reaction force applied from the tire to said braking member when said braking member is pressed onto the tire.

25. A braking apparatus according to claim 24, wherein said braking portion includes:
   a pivoting member which is held by said movable member such that said pivoting member is pivotable about a pivot axis thereof that is substantially parallel to an axis of the wheel of the vehicle so as to be moved between first and second pivot position thereof, and which holds said braking member in a distal end portion thereof; and
   a biasing device which biases said pivoting member in such a direction that causes said braking member to be brought into contact with the tire of the wheel;
   and wherein said movable member is positionable in a reverse-rotation inhibiting position for establishing a reverse-rotation inhibiting state in which said braking member is brought into contact with the tire by a biasing force of said biasing device when the wheel is rotated in a forward direction thereof and in which said pivoting member is moved to said first pivot position so as to cause said braking member to bite into the tire for thereby inhibiting reverse rotation of the wheel when the wheel is about to be rotated in a reverse direction, and in a forward-rotation braking position for establishing a forward-rotation braking state in which said pivoting member is moved to said second pivot position against the biasing force of said biasing device for permitting said braking member to be brought into pressing contact with said resistance applying member.

26. A braking apparatus according to claim 20, wherein said braking member is brought into contact with the tire of the wheel, and wherein said braking portion further includes:
   an attaching device through which said braking member is attached to said movable member such that said braking member is movable relative to said movable member over a predetermined distance toward and away from the wheel; and
   a biasing device which biases said braking member in such a direction that causes said braking member to be moved relative to said movable member toward the wheel.

27. A braking apparatus according to claim 20, wherein braking member is brought into contact with the tire of the wheel, and wherein said braking portion further includes:
   a pivoting member which is held by said movable member such that said pivoting member is pivotable about a pivot axis thereof that is substantially parallel to an axis of the wheel of the vehicle so as to be moved between first and second pivot position thereof, and which holds said braking member in a distal end portion thereof; and
   a biasing device which biases said pivoting member in such a direction that causes said braking member to be brought into contact with the tire of the wheel;
   and wherein said movable member is positionable in a reverse-rotation inhibiting position for establishing a reverse-rotation inhibiting state in which said braking member is brought into contact with the tire by a biasing force of said biasing device when the wheel is rotated in a forward direction thereof, and in which said pivoting member is moved to said first pivot position so as to cause said braking member to bite into the tire for thereby inhibiting reverse rotation of the wheel when the wheel is about to be rotated in a reverse direction.

28. A braking apparatus for braking a wheel of a vehicle, comprising:
   a main body;
   a cam which is supported by said main body such that said cam is rotatable about an axis thereof, and which has a cam surface whose distance from said axis changes as viewed in a circumferential direction of said cam;
   a movable member consisting of a rod which is held by said main body such that said movable member is movable relative to said main body, and which holds a cam follower portion engaging said cam surface, and a braking portion brought into contact with a tire of the wheel; and
   an operating device which includes an operating member operable to be moved in first and second directions, and which rotates said cam in one of opposite directions in response to the movement of said operating member in said first direction, for thereby moving said movable member in a forward direction that causes said braking portion to be displaced toward the tire, and rotates said cam in the other of said opposite directions in response to the movement of said operating member in said second direction, for thereby moving said movable member in a reverse direction that is opposite to said forward direction,
   wherein said braking portion includes:
      a braking member which is brought into contact with the tire of the wheel;
      an attaching device through which said braking member is attached to said movable member such that said braking member is movable relative to said movable member over a predetermined distance toward and away from the wheel; and
      a biasing device which biases said braking member in such a direction that causes said braking member to be moved relative to said movable member toward the wheel.

29. A braking apparatus for braking a wheel of a vehicle, comprising:
   a main body;
   a movable member which is held by said main body such that said movable member is movable relative to said main body, and which includes a braking portion brought into contact with a tire of the wheel; and
   an operating device which includes an operating member, and which is operable to move said braking portion toward and away from the tire of the wheel in response to an operation of said operating member,
   wherein said braking portion includes:
      a braking member which is brought into contact with the tire of the wheel;
      an attaching device through which said braking member is attached to said movable member such that said braking member is movable relative to said movable member over a predetermined distance toward and away from the wheel; and
      a biasing device which biases said braking member in such a direction that causes said braking member to be moved relative to said movable member toward the wheel.

30. A braking apparatus according to claim 29, wherein said attaching device includes a slide which is fitted on said movable member such that said slide is slidably movable relative to said movable member, and a defining device which defines a maximum distance over which said slide can be moved relative to said movable member.

31. A braking apparatus for braking a wheel of a vehicle, comprising:
- a main body;
- a cam which is supported by said main body such that said cam is rotatable about an axis thereof, and which has a cam surface whose distance from said axis changes as viewed in a circumferential direction of said cam;
- a movable member consisting of a rod which is held by said main body such that said movable member is movable relative to said main body, and which holds a cam follower portion engaging said cam surface, and a braking portion brought into contact with a tire of the wheel; and
- an operating device which includes an operating member operable to be moved in first and second directions, and which rotates said cam in one of opposite directions in response to the movement of said operating member in said first direction, for thereby moving said movable member in a forward direction that causes said braking portion to be displaced toward the tire, and rotates said cam in the other of said opposite directions in response to the movement of said operating member in said second direction, for thereby moving said movable member in a reverse direction that is opposite to said forward direction;

wherein said braking portion includes:
- a braking member which is brought into contact with the tire of the wheel;
- a pivoting member which is held by said movable member such that said pivoting member is pivotable about a pivot axis thereof that is substantially parallel to an axis of the wheel of the vehicle so as to be moved between first and second pivot positions thereof, and which holds said braking member in a distal end portion thereof; and
- a biasing device which biases said pivoting member in such a direction that causes said braking member to be brought into contact with the tire of the wheel;
- and wherein said movable member is positionable in a reverse-rotation inhibiting position for establishing a reverse-rotation inhibiting state in which said braking member is brought into contact with the tire by a biasing force of said biasing device when the wheel is rotated in a forward direction thereof, and in which said pivoting member is moved to said first pivot position so as to cause said braking member to bite into the tire for thereby inhibiting reverse rotation of the wheel when the wheel is about to be rotated in a reverse direction.

32. A braking apparatus for braking a wheel of a vehicle, comprising:
- a main body;
- a movable member which is held by said main body such that said movable member is movable relative to said main body, and which includes a braking portion brought into contact with a tire of the wheel; and
- an operating device which includes an operating member, and which is operable to move said braking portion toward and away from the tire of the wheel in response to an operation of said operating member, wherein said braking portion includes:
- a braking member which is brought into contact with the tire of the wheel;
- a pivoting member which is held by said movable member such that said pivoting member is pivotable about a pivot axis thereof that is substantially parallel to an axis of the wheel of the vehicle so as to be moved between first and second pivot positions thereof, and which holds said braking member in a distal end portion thereof; and
- a biasing device which biases said pivoting member in such a direction that causes said braking member to be brought into contact with the tire of the wheel;
- and wherein said movable member is positionable in a reverse-rotation inhibiting position for establishing a reverse-rotation inhibiting state in which said braking member is brought into contact with the tire by a biasing force of said biasing device when the wheel is rotated in a forward direction thereof, and in which said pivoting member is moved to said first pivot position so as to cause said braking member to bite into the tire for thereby inhibiting reverse rotation of the wheel when the wheel is about to be rotated in a reverse direction.

33. A braking apparatus according to claim 32, wherein said biasing device biases said pivoting member in such a direction that causes said pivoting member to be moved toward said first pivot position.

34. A braking apparatus according to claim 32, wherein said biasing device biases said pivoting member in such a direction that causes said pivoting member to be moved toward the tire of the wheel.

35. A braking apparatus for braking a wheel of a vehicle, comprising:
- a main body;
- a movable member which is held by said main body such that said movable member is movable relative to said main body, and which includes a braking portion brought into contact with a tire of the wheel; and
- an operating device which includes an operating member, and which is operable to move said braking portion toward and away from the tire of the wheel in response to an operation of said operating member, wherein said braking portion includes:
- a braking member which is rotatable about an axis thereof and which has an outer circumferential surface that is brought into pressing contact with the tire of the wheel.

* * * * *